US011869306B2

(12) United States Patent
Schwartz

(10) Patent No.: US 11,869,306 B2
(45) **Date of Patent: *Jan. 9, 2024**

(54) TOUCHPOINT-DEPENDENT TRANSACTIONS

(71) Applicant: Global Payments Gaming Services Inc., Las Vegas, NV (US)

(72) Inventor: Andrew J. Schwartz, Las Vegas, NV (US)

(73) Assignee: Global Payments Gaming Services Inc., Las Vegas, NV (US)

( * ) Notice: Subject to any disclaimer, the term of this patent is extended or adjusted under 35 U.S.C. 154(b) by 278 days.

This patent is subject to a terminal disclaimer.

(21) Appl. No.: 17/015,596

(22) Filed: Sep. 9, 2020

(65) Prior Publication Data

US 2021/0082242 A1 Mar. 18, 2021

Related U.S. Application Data

(63) Continuation of application No. 16/190,224, filed on Nov. 14, 2018, now Pat. No. 10,825,292.

(60) Provisional application No. 62/741,051, filed on Oct. 4, 2018, provisional application No. 62/586,321, filed on Nov. 15, 2017.

(51) Int. Cl.
*G07F 17/32* (2006.01)

(52) U.S. Cl.
CPC ................................ *G07F 17/3244* (2013.01)

(58) Field of Classification Search
CPC ............. G07F 17/3244; G07F 17/3204; G07F 17/3223; G07F 17/3251
See application file for complete search history.

(56) References Cited

U.S. PATENT DOCUMENTS 8,845,416 B2 9/2014 Schwartz
9,269,231 B2 2/2016 Curtin et al.
9,508,069 B2 11/2016 Kumar et al.
(Continued)

OTHER PUBLICATIONS

Final Office Action for U.S. Appl. No. 17/029,899; dated May 26, 2023 (15 pages).
(Continued)

*Primary Examiner* — James S. McClellan
*Assistant Examiner* — Ross A Williams
(74) *Attorney, Agent, or Firm* — Mendelsohn Dunleavy, P.C.; Steve Mendelsohn

(57) ABSTRACT

A transaction is facilitated at a business's touchpoint by transmitting from a wireless device (e.g., a patron's cell phone) to a transaction server operated by a transaction-funding business: patron-identifying information for the patron and a touchpoint ID associated with the touchpoint read using the wireless device. The transaction server authorizes the transaction, transmits that authorization to the cell phone and/or the touchpoint business, and the touchpoint business provides goods/services to the patron. In some implementations, the transaction-funding business transfers outgoing funds for the transaction to the touchpoint business and receives incoming funds for the transaction from the patron. In a casino, a patron can use his/her cell phone to purchase gaming credit at a gaming table. The transaction-funding business funds the purchase for the patron without any funds ever residing on or passing through the patron's cell phone.

37 Claims, 9 Drawing Sheets

(56) References Cited

U.S. PATENT DOCUMENTS

| | | | | |
|---|---|---|---|---|
| 9,666,027 | B2 | 5/2017 | Curtin et al. | |
| 9,928,502 | B2 | 3/2018 | Curtin et al. | |
| 2013/0065666 | A1 | 3/2013 | Schueller et al. | |
| 2013/0065686 | A1 | 3/2013 | LeMay et al. | |
| 2014/0256407 | A1 | 9/2014 | Graf et al. | |
| 2016/0086145 | A1 | 3/2016 | Tsutsui | |
| 2019/0197830 | A1* | 6/2019 | Petersen | G07F 17/3223 |
| 2020/0020196 | A1 | 1/2020 | Petersen et al. | |

OTHER PUBLICATIONS

Non-Final Office Action for U.S. Appl. No. 17/094,959; dated Sep. 14, 2023 (16 pages).

* cited by examiner

640

TOUCHPOINT-DEPENDENT TRANSACTIONS

CROSS-REFERENCE TO RELATED APPLICATIONS

This application is a continuation of U.S. application Ser. No. 16/190,224, filed on Nov. 14, 2018, which claims the benefit of the filing date of U.S. provisional application No. 62/586,321, filed on Nov. 15, 2017 and U.S. provisional application No. 62/741,051, filed on Oct. 4, 2018, the teachings of all three of which are incorporated herein by reference in their entirety.

BACKGROUND

Field of the Invention

The present invention relates to techniques for purchasing or renting goods and/or services at touchpoints (i.e., particular physical locations) of touchpoint businesses, such as, without limitation, purchasing gaming credit at a particular gaming machine in a casino and other gaming establishment.

Description of the Related Art

This section introduces aspects that may help facilitate a better understanding of the invention. Accordingly, the statements of this section are to be read in this light and are not to be understood as admissions about what is prior art or what is not prior art.

A conventional casino has a distributed network of processor-based nodes that support the gaming operations of the casino. In addition to the gaming machines (e.g., slot machines and video poker machines) themselves, the casino's nodes include a ticket server and one or more kiosks. The gaming machines and kiosks are capable to generating and redeeming paper vouchers. A paper voucher, such as a TITO (ticket in, ticket out) ticket, is a piece of paper having a unique, printed code symbol, such as a one-dimensional barcode or a two-dimensional QR code, that represents a unique voucher ID (e.g., a unique voucher number), where a specific monetary value is associated with that voucher ID.

As used herein, the term "monetary value" is a number that represents a particular amount of funds (e.g., gaming credit corresponding to a particular number of U.S. dollars), but not the funds themselves. Thus, when a device is said to store a monetary value of $100 associated with a gaming voucher, the device stores the corresponding number 100, not the funds themselves, and when one device is said to transfer that monetary value to another device, the transmitting device transmits the corresponding number 100, not the funds themselves. When the actual funds are moved from one entity to another, reference will be made to the transfer of such funds, not to the mere transmission of the number that is the monetary value of those funds.

A casino patron can instruct a kiosk to generate a paper voucher by inserting cash into the kiosk or using a bank card, such as a credit card or a debit card, or a player card assigned to the patron to transfer funds to pay for the paper voucher. Similarly, a patron can instruct a gaming machine to generate a paper voucher based on gaming credit available on the gaming machine. This is referred to as a cash-out operation. When instructed to generate a paper voucher having a specified monetary value, the kiosk or gaming machine transmits the monetary value to the ticket server, which assigns a unique voucher ID associated with the paper voucher, stores the monetary value and the associated voucher ID in a local voucher database, and transmits the voucher ID back to the kiosk or gaming machine. The kiosk or gaming machine generates the paper voucher by printing on a piece of paper the monetary value and a unique code symbol, such as a one-dimensional barcode or a two-dimensional QR code, that represents the unique voucher ID.

A patron can redeem a paper voucher at a kiosk by inserting the paper voucher into the kiosk or having the kiosk scan the paper voucher. The kiosk determines the voucher ID represented by the printed code symbol and transmits the voucher ID to the ticket server. The ticket server uses the received voucher ID to retrieve the associated monetary value from its voucher database and transmits the retrieved monetary value to the kiosk. The ticket server then deletes that entry from its voucher database or otherwise indicates that that entry is no longer active. Depending on instructions from the patron, the kiosk can dispense cash (and, if appropriate, coins) to the patron or credit the patron's bank card account based on the monetary value received from the ticket server.

In a similar manner, a patron can redeem a paper voucher at a gaming machine by inserting the paper voucher into the gaming machine. This is referred to as a cash-in operation. The gaming machine determines the voucher ID represented by the printed code symbol and transmits the voucher ID to the ticket server. The ticket server uses the received voucher ID to retrieve the associated monetary value from its voucher database and transmits the retrieved monetary value to the gaming machine. As before, the ticket server then deletes that entry from its voucher database or otherwise indicates that that entry is no longer active. The gaming machine increases the gaming credit on the gaming machine based on the monetary value received from the ticket server.

After a paper voucher has been redeemed, whether at a gaming machine or at a kiosk, the ticket server updates the corresponding record in the voucher database to reflect that the voucher ID associated with the redeemed paper voucher no longer has any monetary value associated with it. As such, the paper voucher itself no longer has any monetary value associated with it. In typical casino operations, voucher IDs are either never re-used or they are re-used only after the previously issued paper voucher having the same voucher ID has been redeemed such that no voucher ID is concurrently assigned to multiple, unredeemed paper vouchers. If the patron or someone else attempts to redeem a previously redeemed paper voucher or a photocopy of that paper voucher at a gaming machine or a kiosk, then the ticket server will determine that the voucher ID associated with that paper voucher has no monetary value associated with it.

The printing of new paper vouchers and the disposal of redeemed paper vouchers are overhead costs for the operations of a casino. Furthermore, if a paper voucher is misplaced by a patron or stolen from a patron or even photocopied without the patron's permission and awareness, then another person in possession of that paper voucher (or photocopy) would be able to redeem that paper voucher (or photocopy) at a gaming machine or kiosk instead of the patron to whom the paper voucher rightfully belongs.

U.S. Patent Application Publication No. 2013/0065686 ('the '686 application"), the teachings of which are incorporated herein by reference in their entirety, discloses a gaming machine that supports both conventional paper vouchers as well as virtual vouchers. As used herein, the term "virtual voucher" (or "VV" for short) refer to a non-physical voucher having a voucher ID and an associated monetary value, but that does not involve the printing of a code symbol onto a piece of paper (or other physical substrate). In particular, for virtual vouchers, a gaming machine of the '686 application is capable of performing an electronic (i.e., paperless) cash-in operation in which a patron uses a wireless device, such as a cell phone running a virtual voucher application ("VV app"), to wirelessly transmit to the gaming machine the unique voucher ID associated with a previously created virtual voucher. The gaming machine will then communicate with the casino's ticket server to redeem the virtual voucher in return for gaming credit on the gaming machine equivalent to the monetary value of the virtual voucher. The gaming machine is also capable of performing an electronic cash-out operation in which the gaming machine communicates with the ticket server to create a new virtual voucher corresponding to some or all of the gaming credit remaining on the gaming machine and then transmit to a patron's wireless device the unique voucher ID and monetary value for the virtual voucher.

As described in paragraph [0043] of the '686 application, the casino's ticket server maintains two separate databases: one for paper vouchers and another for virtual vouchers. Furthermore, all of the voucher IDs for paper vouchers may have a common prefix (e.g., 01-xxxxxx-xx), while all of the voucher IDs for virtual vouchers have a different, common prefix (e.g., 02-xxxxxx-xx), which enables the gaming machine to determine whether that voucher is a paper voucher or a virtual voucher. Note that, in the '686 application, the VV app stores the voucher ID associated with the virtual voucher and its monetary value on the patron's wireless device.

FIG. 2 of the '686 application is a block diagram of a gaming machine that supports virtual vouchers. This gaming machine includes a game controller having a number of components designed to support virtual vouchers that do not exist in legacy gaming machines that were designed to support paper vouchers, but not virtual vouchers. The input panel of this gaming machine also includes two physical buttons designed to support the electronic cash-in and cash-out operations associated with virtual vouchers that do not exist in legacy gaming machines.

FIG. 3A of the '686 application is a block diagram of a retrofitted gaming machine that includes certain components (e.g., retrofit device 52, physical buttons 24 and 26, and hard meters 86) that have been added to a legacy gaming machine to enable the retrofit gaming machine to support virtual vouchers, without having to modify the legacy machine's game controller. FIG. 3B of the '686 application is a block diagram of another retrofit gaming machine made by (i) replacing the bill validator and the printer of a legacy gaming machine with a new bill validator and a new printer designed to support virtual vouchers and (ii) adding hard meters and two physical buttons for the electronic cash-in and cash-out operations. Here, too, the legacy machine can be retrofit to support virtual vouchers without having to modify the legacy machine's game controller.

Note that, in both retrofit embodiments of FIGS. 3A and 3B of the '686 application, in addition to removing legacy components from and/or adding new components to the electronics located inside the legacy gaming machine, the legacy gaming machine's input panel is modified to add the cash-in and cash-out buttons.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Casino System with Virtual Vouchers

In certain embodiments described herein, a distributed casino network supports virtual vouchers in addition to or instead of paper vouchers.

Figure 1:
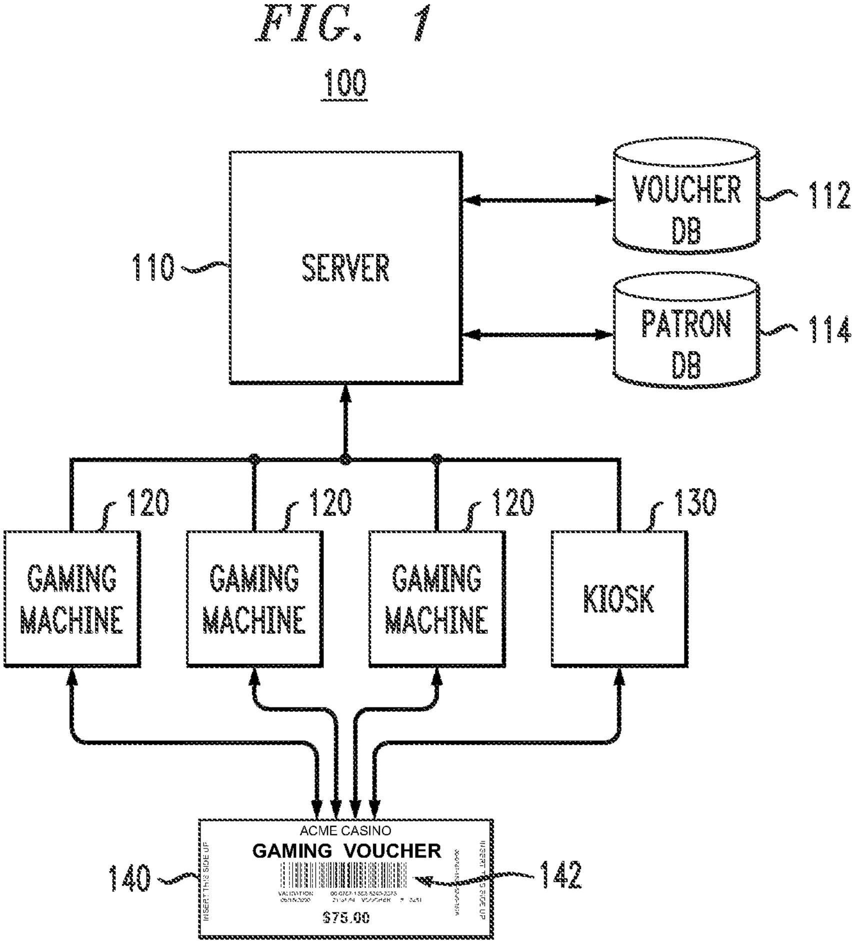
FIG. 1 is a simplified block diagram of a distributed gaming system 100 according to certain embodiments.

FIG. 1 is a simplified block diagram of a distributed gaming system 100 according to certain embodiments. Gaming system 100 includes a system server 110, multiple gaming machines 120, and one or more kiosks 130. The system server 110 maintains a voucher database 112 and a patron database 114. The gaming machines 120 and the kiosks 130 are all capable of (i) printing and dispensing new paper vouchers 140 with barcodes 142 representing the assigned voucher IDs and (ii) receiving and reading existing paper vouchers 140 with barcodes 142 representing the assigned voucher IDs. In addition, although not explicitly depicted in FIG. 1, the gaming machines 120 and the kiosks 130 are capable of participating in the generation of new virtual vouchers and the reading of existing virtual vouchers.

Figure 2:
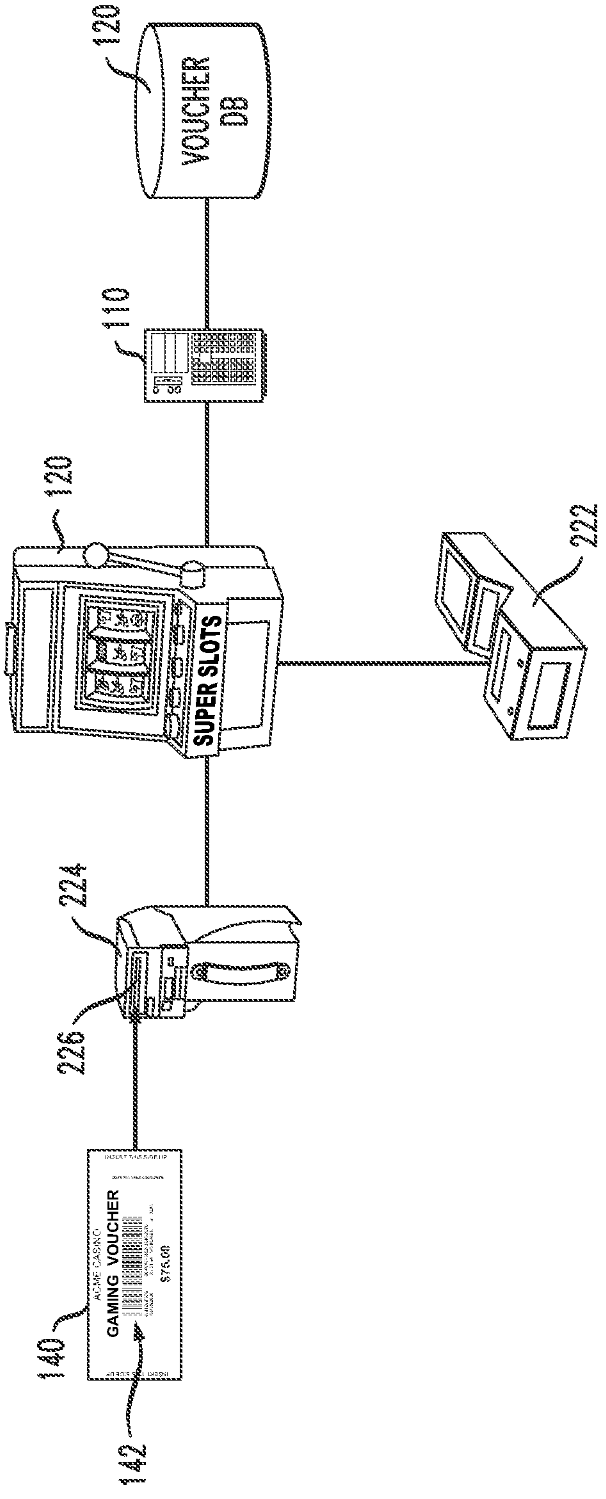
FIG. 2 is a simplified diagram showing one of the gaming machines of FIG. 1 connected (either wirelessly or by wireline) to communicate with the system server of FIG. 1.

FIG. 2 is a simplified diagram showing one of the gaming machines 120 of FIG. 1 connected (either wirelessly or by wireline) to communicate with the system server 110. As represented in FIG. 2, the gaming machine 120 includes printer assembly 222, which in turn includes bill validator 224. The printer assembly 222 is capable of printing and dispensing new paper vouchers 140 as well as receiving and reading existing paper vouchers 140. When a patron inserts an existing paper voucher 140 into the slot 226 of the bill validator 224, the bill validator 224 reads the barcode 142 printed on the paper voucher 140 and transmits the corresponding voucher ID to the system server 110, which uses the voucher ID to retrieve the associated monetary value from the voucher database 112 and transmits a message identifying that monetary value back to the gaming machine 120, which then credits the patron with that monetary value for subsequent gaming by the patron on the gaming machine 120. When a patron inserts a paper currency bill into the slot 226 of the bill validator 224, the bill validator 224 determines the denomination of the bill and credits the patron with that monetary value for subsequent gaming by the patron on the gaming machine 120.

According to certain embodiments, at least one of the gaming machines 120 of FIG. 1 is a conventional gaming machine that has been retrofitted with a bezel code reader (not shown in FIG. 2) that is mounted onto the facade of the printer assembly 222, where the bezel code reader enables the gaming machine 120 to read a barcode and/or other suitable readable codes, such as (without limitation) a QR code, that represents a voucher ID and which is rendered on the display of a cell phone or other suitable electronic device, such as an electronic tablet. According to certain embodiments, at least one gaming machine 120 is designed with a built-in code reader (not shown in FIG. 2) that provides that same functionality. In either case, after the code reader determines the voucher ID associated with a rendered readable code, the gaming machine 120 transmits the voucher ID to the system server 110, which retrieves the associated monetary value from the voucher database 112 and transmits a message identifying that monetary value to the gaming machine 120, which then credits the patron with that monetary value for subsequent gaming by the patron on the gaming machine 120. As such, in addition to supporting the conventional gaming machine functions associated with paper vouchers 140, the gaming machine 120 also supports analogous gaming machine functions associated with virtual vouchers.

Although not depicted in the drawings, a kiosk 130 of FIG. 1 is provisioned with a printer assembly analogous to the printer assembly 222 of gaming machine 120 of FIG. 2 and having a bill validator analogous to the bill validator 224 of FIG. 2 and either an added bezel code reader or a built-in code reader analogous to the added bezel or built-in code reader of gaming machine 120. Here, too, in addition to supporting the conventional kiosk functions associated with conventional paper vouchers, the kiosk 130 supports analogous kiosk functions associated with virtual vouchers.

According to certain embodiments, for at least each existing virtual voucher, the corresponding record in the voucher database 112 contains the identity of the patron in addition to identifying the assigned voucher ID and the monetary value associated with the virtual voucher. In at least some of these embodiments, when a patron attempts to redeem an existing virtual voucher, for example, by presenting to the code reader of a gaming machine or kiosk, such as a gaming machine 120 or a kiosk 130, the display of a cell phone with a rendered readable code corresponding to the voucher ID, the gaming system 100 verifies that the user of the cell phone is the same person as the patron who is identified in the voucher database as the owner of the virtual voucher.

In some possible implementations, the gaming system 100 employs the fingerprint or thumbprint recognition capability that is supported by certain cell phone applications. Other implementations may rely on other identification techniques that may be supported by cell phones or other suitable electronic devices, such as voice recognition, face recognition, retinal pattern recognition, and the like, in addition to or instead of fingerprint/thumbprint recognition. Other implementations may require the user to provide a password or other security-related information. In such embodiments, the cell phone communicates via the cell phone network (or other suitable wireless communications network) to identify the user to the system server 110. If the system server 110 determines that the identity of the user matches the identity of the patron identified in the voucher database record for the virtual voucher identified by the voucher ID received from the gaming machine or kiosk, then the system server 110 will allow the virtual voucher to be redeemed. Otherwise, if the identities do not match, then the system server 110 will refuse to allow the virtual voucher to be redeemed. In this way, if the patron's cell phone is misplaced or stolen or if the virtual voucher itself is somehow copied without the patron's permission and awareness, then the system server 110 will be able to prevent unauthorized redemption of the virtual voucher.

Furthermore, by supporting virtual vouchers, the casino's overhead costs associated with generating and disposing of paper vouchers can be reduced. Although embodiments have been described in the context of gaming machines and kiosks that support both virtual vouchers and paper vouchers, in other embodiments, a casino computer system can be deployed with some or even all gaming machines and kiosks that support only virtual vouchers. In that way, the disadvantages associated with paper vouchers will be further reduced or even eliminated.

When a patron requests cashing out at a gaming machine 120, the gaming machine transmits a request to the system server 110 along with information about the monetary value of the patron's current credit level at the gaming machine. In response, the system server 110 generates a new virtual voucher by assigning a new unique voucher ID, creating a new record in the voucher database 112 with the newly assigned voucher ID, the received monetary value, and the patron's identity. Alternatively, the system server 110 updates the existing record for the patron's existing virtual voucher retaining the same voucher ID. Note that, depending on the particular implementation, there are a number of different ways in which the system server 110 knows the identity of the patron.

In one possible implementation, a patron inserts his/her unique player card into a gaming machine 120, which reads and transmits patron identification information encoded in the player card to the system server 110, which maintains a patron database 114 (FIG. 1) that identifies the patron. In another possible implementation, the patron uses his/her cell phone to transmit via the cell phone network the patron's identity along with the identity of the gaming machine 120 using Bluetooth low-energy (BLE) or other near-field communication (NFC) connections or PIN authentication. In any case, the system server 110 creates/updates the virtual voucher and transmits information about the virtual voucher (e.g., the voucher ID or an image of the corresponding readable code) via the cell phone network back to the patron's cell phone. Kiosks 130 can participate in the generation of new virtual vouchers in an analogous manner. The patron can then use his/her cell phone to redeem the virtual voucher at the same or other gaming machine 120 or kiosk 130 by rendering the corresponding readable code on the cell phone's display.

Figure 3A:
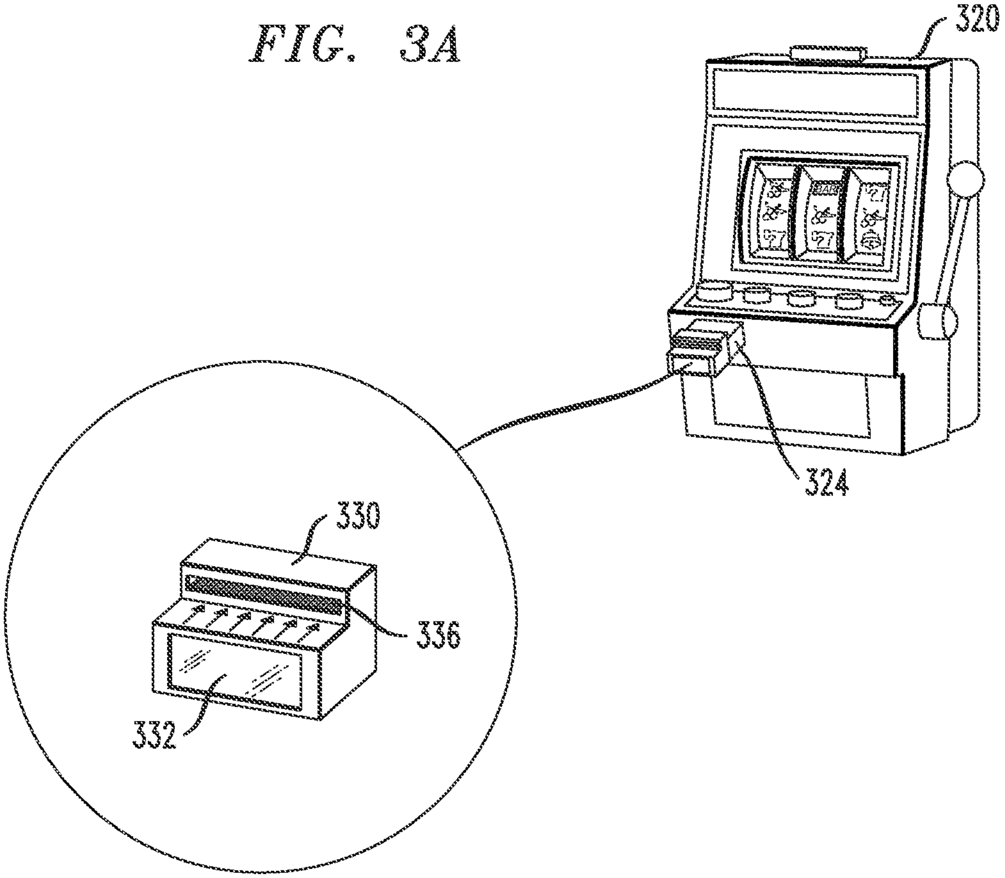
FIG. 3A shows a perspective view of a conventional gaming machine retrofitted with a bezel mounted onto the front of the gaming machine at its bill validator to become an example of one possible type of the gaming machine of FIG. 1.

FIG. 3A shows a perspective view of a conventional gaming machine 320 retrofitted with a bezel 330 mounted onto the front of the gaming machine 320 at its bill validator 324 to become an example of one possible type of gaming machine 120 of FIG. 1. The bezel 330 has a slot 336 that aligns with the slot of the bill validator 324 to enable a patron to insert a paper voucher 340 into the bill validator 324.

Figure 3B:
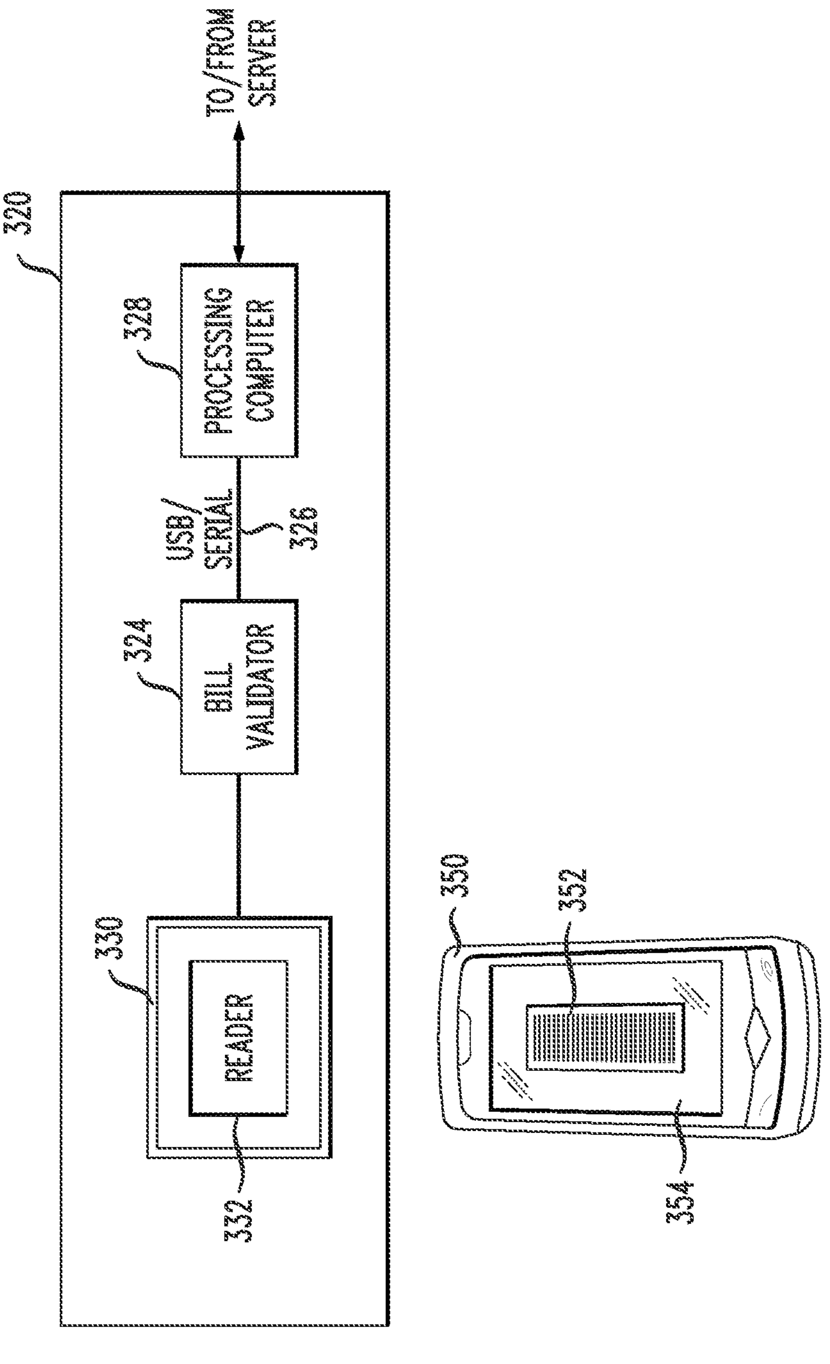
FIG. 3B is a simplified block diagram of the gaming machine of FIG. 3A.

FIG. 3B is a simplified block diagram of the gaming machine 320 of FIG. 3A. As shown in FIG. 3B, the gaming machine 320 has bezel 330 with code reader 332. Code reader 332 is electrically connected to bill validator 324, which is itself electrically connected via USB/serial link 326 to the gaming machine's processing computer 328, which communicates with the server, such as the system server 110 of FIG. 1. The bill validator 324, which is powered by the serial/USB link 326, has its own optical sensors and firmware-programmed processor (not shown) that enable the bill validator 324 to distinguish genuine paper currency bills from fraudulent ones, read conventional paper vouchers with printed barcodes, and communicate with the gaming machine's processing computer 328. The bill validator 324 can read and hold a paper voucher in escrow while it sends the paper voucher's voucher ID via the processing computer 328 to the system server 110 (FIG. 1) for validation.

The code reader 332 can read a barcode (or other suitable readable code) 352 rendered on the display 354 of a cell phone 350 (or other suitable electronic device) that is presented to the code reader 332. The code reader 332 utilizes the bill validator's processor to support communications with the processing computer 328, which is programmed to support the functionality of the code reader 332. Typical code readers communicate over a HID (human interface device) interface via a serial or USB connection. Although some bill validators have secondary interface ports, other bill validators may need to be modified to accommodate an auxiliary code reader, such as code reader 332. Since existing bill validators already have built-in code readers that can read inserted paper vouchers and transmit the corresponding voucher IDs to the processing computer 328, a person of ordinary skill in the art would understand how to connect an auxiliary code reader to an existing bill validator to enable the auxiliary code reader to read the cellphone-rendered barcode of a virtual voucher and transmit the corresponding voucher ID to the processing computer 328.

Figure 4:
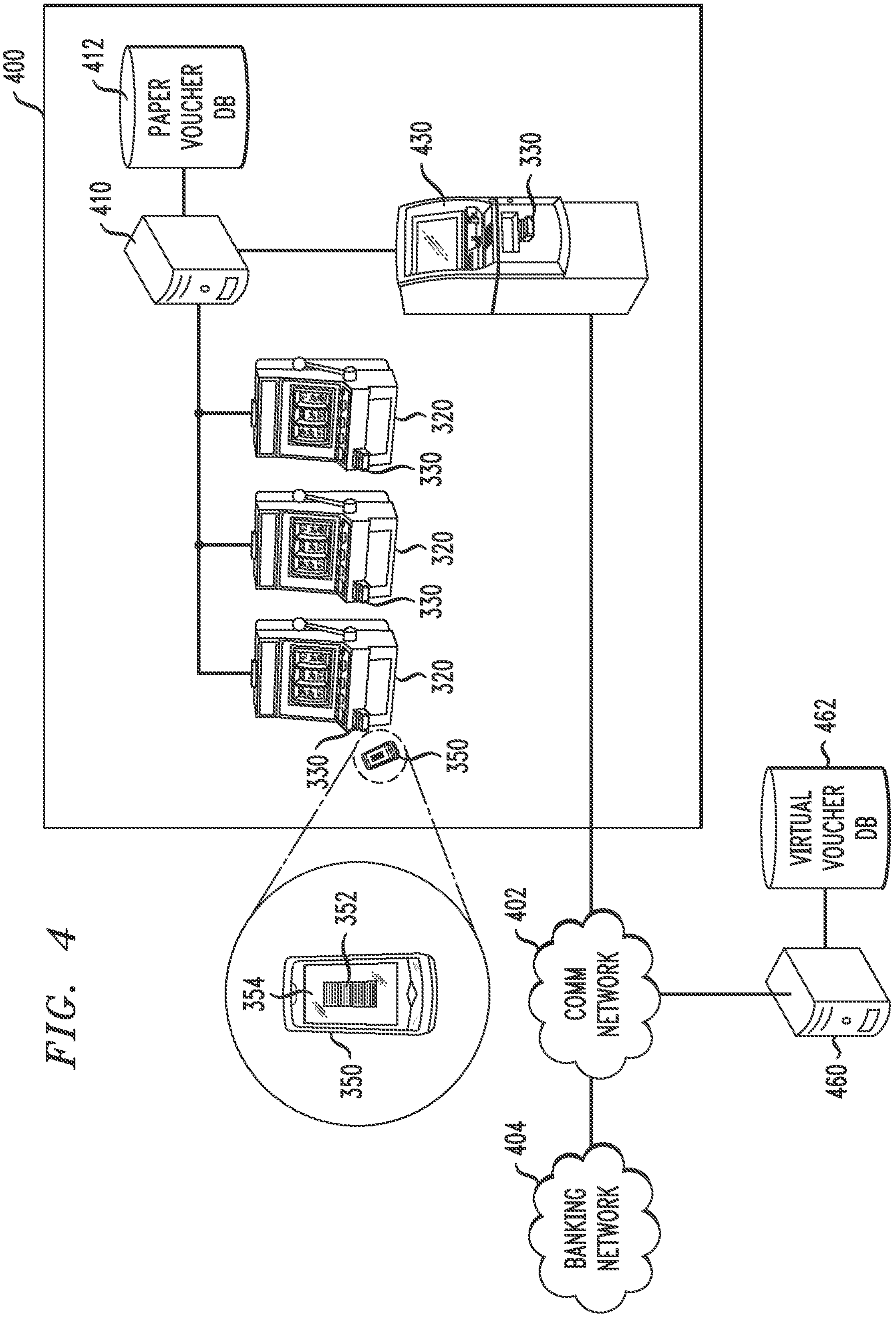
FIG. 4 shows a symbolic diagram representing a gaming system for a casino or other suitable gaming establishment) configured to support virtual vouchers, according to one possible implementation.

FIG. 4 shows a symbolic diagram representing a gaming system 400 for a casino or other suitable gaming establishment) configured to support virtual vouchers, according to one possible implementation. In certain implementations, gaming system 400 is an existing, legacy gaming establishment that has been upgraded to support virtual vouchers. As shown in FIG. 4, gaming system 400 has a casino server 410 in communication with a voucher database 412, a number of gaming machines 320 of FIGS. 3A-3B (such as (without limitation) slot machines and/or poker machines), and at least one kiosk 430.

As an upgraded legacy system, gaming system 400 can still support conventional paper vouchers with barcode labels or other unique identifying indicia printed on them, such as paper vouchers 140 of FIGS. 1 and 2. In particular, a patron (not shown) can use kiosk 430 to secure a paper voucher by, for example, inserting cash into the kiosk 430 or using the kiosk to communicate with appropriate banking networks 404 via appropriate communication networks 402 (e.g., the Internet) to transfer funds from the patron's bank card account to the casino's bank account. The kiosk 430 communicates with the casino server 410 to establish a corresponding paper voucher entry in the paper voucher database 412 identifying the patron, the monetary value of the paper voucher, and an assigned voucher ID associated with the paper voucher. The kiosk 430 then prints and dispenses a paper voucher (similar to paper voucher 140 of FIG. 1) with a barcode label corresponding to the assigned voucher ID. When the patron inserts the paper voucher into the bill validator of one of the gaming machines 320, the bill validator reads the paper voucher and communicates with the casino server 410 to authenticate the paper voucher and receive authorization from the casino server 410 to allow the patron to operate the gaming machine based on the monetary value of the paper voucher. When the patron is finished with that gaming machine 320, the gaming machine can communicate with the casino server 410 to either update the monetary value of the same paper voucher record in paper voucher database 412 or create a new record in the database for a new paper voucher having a different barcode label. The gaming machine 320 can then dispense a corresponding paper voucher to the patron for use at another gaming machine 320 or for redemption at a kiosk 430.

According to this implementation, the pre-existing legacy gaming establishment has been upgraded to be gaming system 400, which supports virtual vouchers in addition to paper vouchers. This upgrade involves the addition of a barcode-reading bezel, such as bezel 330 with code reader 332 of FIGS. 3A-3B, to the bill validator of each gaming machine 320 and each kiosk 430 in the gaming establishment. No other hardware upgrade is required. The upgrade also involves updating the respective software in the casino server 410, in each gaming machine 320, and in each kiosk 430 to support virtual vouchers.

FIG. 4 also shows a virtual voucher (VV) server 460, which controls the creation and redemption of virtual vouchers and maintains a virtual voucher database 462 of those virtual vouchers. In this particular implementation, the VV server 460 is located outside of the gaming system 400 and is distinct from the casino server 410, and the VV database 462 is co-located with the VV server 460 and is distinct from the paper voucher database 412. In other possible implementations, the VV server 460 is part of the casino server 410, and the VV database 462 and the paper database 412 both contained in a single voucher database located within the gaming system 400.

In addition, FIG. 4 shows a patron's cell phone 350, which runs a special virtual voucher application ("VV app") that supports the use of virtual vouchers, including the rendering of barcodes associated with virtual vouchers on the cell phone display.

Figure 5:
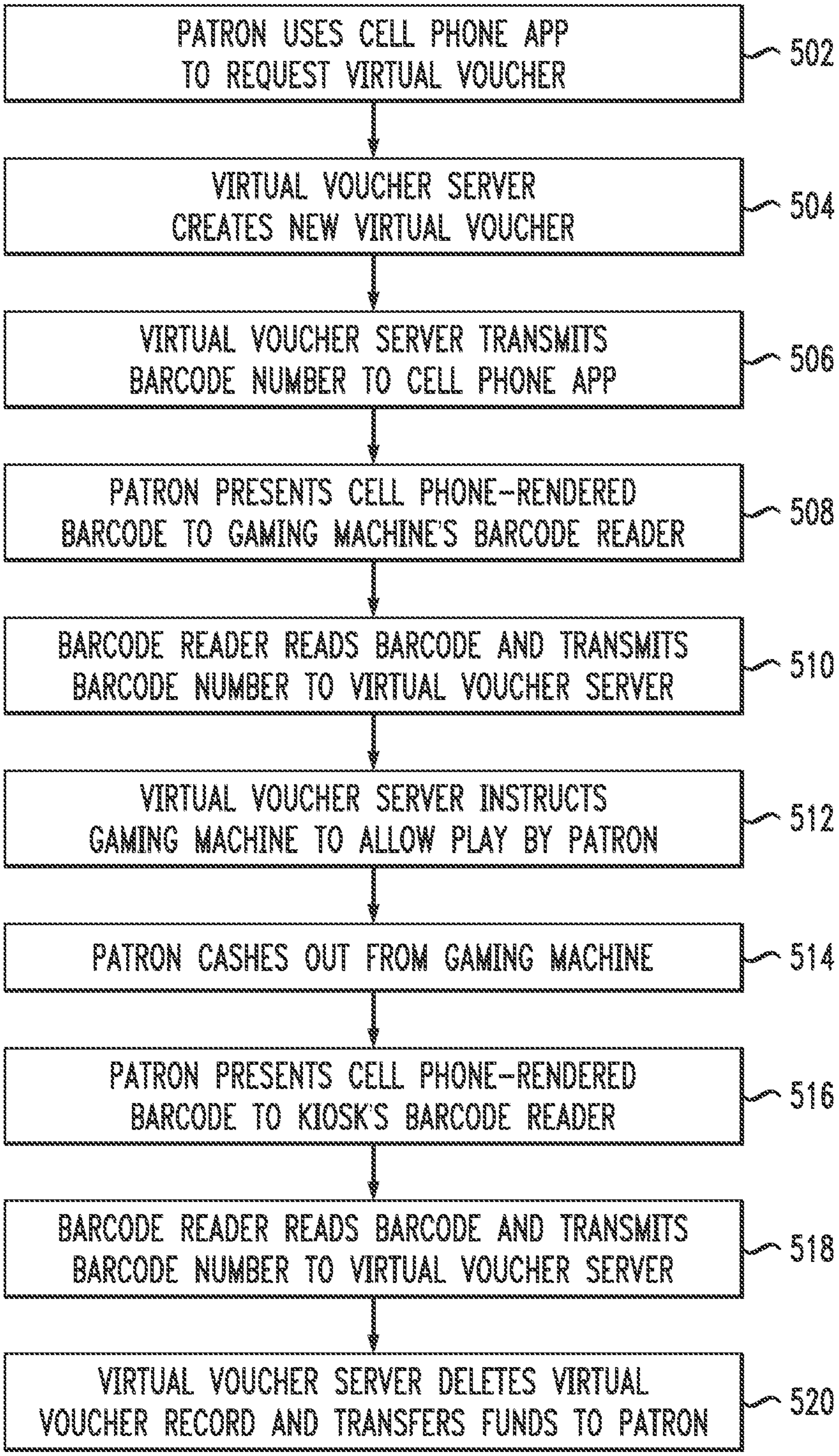
FIG. 5 is a flow diagram representing some of the operations of the gaming system of FIG. 4 related to virtual vouchers.

FIG. 5 is a flow diagram representing some of the operations of gaming system 400 of FIG. 4 related to virtual vouchers. In step 502, a patron uses the VV app loaded onto his/her cell phone 350 to access via appropriate communication networks 402 the VV server 460 to request a new virtual voucher having a specified monetary value.

In step 504, the VV server 460 communicates via appropriate communication networks 402 with appropriate banking networks 404 to transfer funds from the patron's bank card account to the casino's bank account and to create a new VV record in the VV database 462 for the new virtual voucher.

In step 506, the VV server 460 transmits a corresponding voucher ID via appropriate communication networks 402 to the VV app on the patron's cell phone 350.

In step 508, the patron uses the VV app to render a barcode corresponding to the voucher ID on the cell phone's display and presents the cell phone 350 with the rendered barcode to the bezel code reader configured to a desired gaming machine 320.

In step 510, the code reader in the gaming machine 320 reads the rendered barcode and transmits the corresponding voucher ID to the VV server 460 via the casino server 410, the kiosk 430, and appropriate communication networks 402.

In step 512, the VV server 460 uses the voucher ID to access the corresponding VV record in the VV database 462 to determine the monetary value of the virtual voucher and communicates with the patron's gaming machine 320 via the appropriate communication networks 402, the kiosk 430, and the casino server 410 to enable the patron to operate the gaming machine based on the monetary value of the virtual voucher.

In step 514, after the patron has finished operating the gaming machine 320, the patron cashes out of the gaming machine, for which the gaming machine communicates with the VV server 410 via the casino server 410, the kiosk 430, and the appropriate communication networks 402 to update the VV record in the VV database 462 based on the patron's remaining credit on the gaming machine. Note that, in this implementation, the same virtual voucher is maintained for the patron and only the monetary value is updated. In other implementations, the previous virtual voucher is deleted, and a new virtual voucher with a new voucher ID is created. In that case, the VV server 460 transmits the new voucher ID to the patron's VV app.

In any case, the patron can then move to a new gaming machine 320 and cause a repetition of steps 508-514 at that new gaming machine. Steps 508-514 can be repeated any number of times as long the patron's active virtual voucher has sufficient monetary value associated with it.

If and when the patron is ready to redeem his/her virtual voucher, in step 516, the patron presents the cell phone 350 with the virtual voucher's rendered barcode to the code reader configured to a kiosk 430.

In step 518, the kiosk's code reader reads the rendered barcode and transmits the corresponding voucher ID via appropriate communication networks 402 to the VV server 460.

In step 520, the VV server 460 deletes the corresponding VV record from the VV database 462 and communicates via appropriate communication networks 402 with appropriate banking networks 404 to transfer corresponding funds from the casino's bank account to the patron's bank card account. Alternatively, the patron could redeem the virtual voucher by requesting cash, in which case, the kiosk 430 would still communicate with the VV server 460 to delete the corresponding VV record, but no funds would be electronically transferred to the patron's bank card account. Instead, the VV server 460 would transmit information about the monetary value of the virtual voucher back to the kiosk for the kiosk to dispense an equivalent amount of paper currency to the patron.

Casino System with Tokenized Transaction Packages

Figure 6:
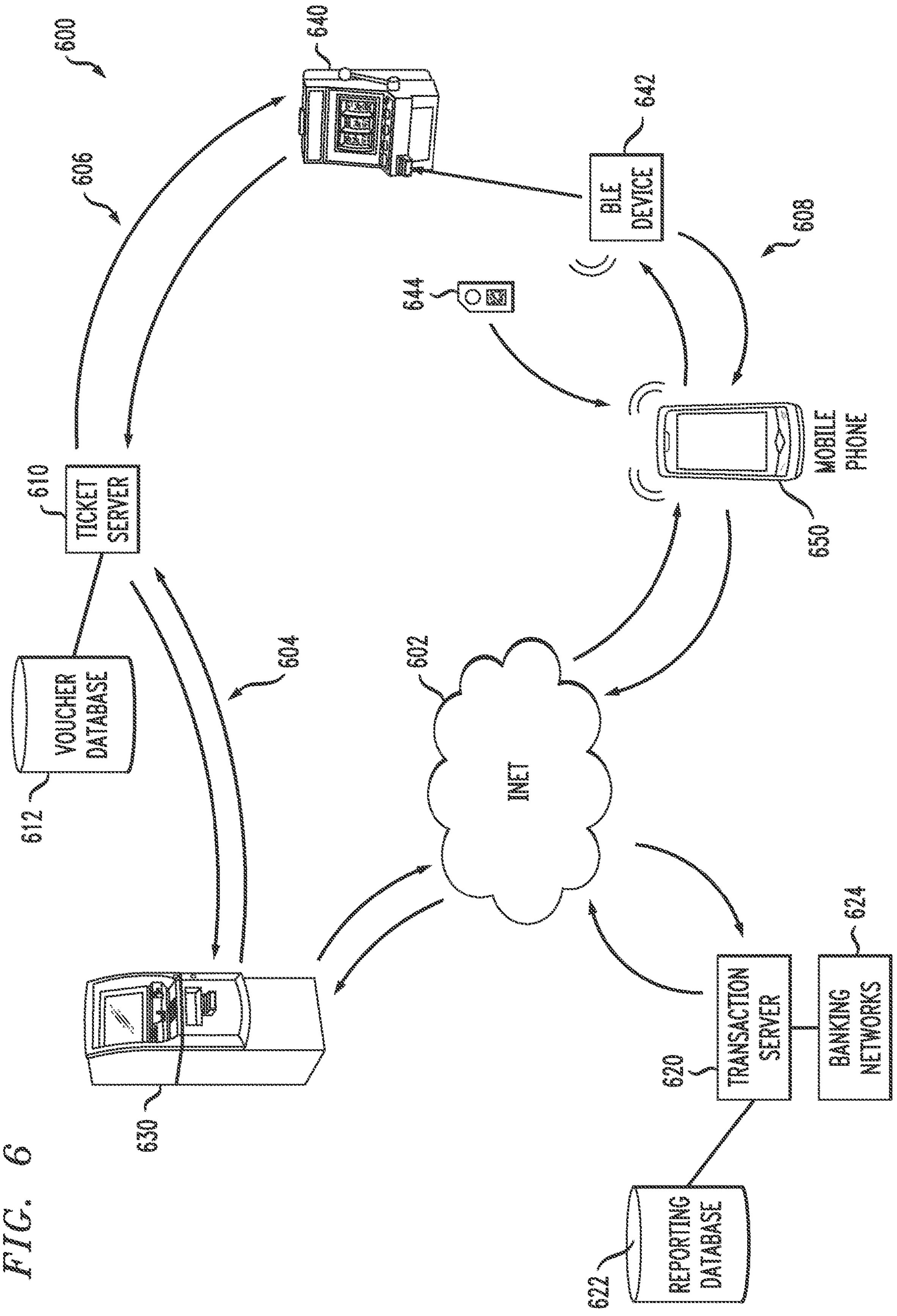
FIG. 6 shows a symbolic diagram representing a distributed gaming system for a casino or other suitable gaming establishment that supports gaming vouchers, according to another possible embodiment.

FIG. 6 shows a symbolic diagram representing a distributed gaming system 600 for a casino or other suitable gaming establishment that supports gaming vouchers, according to another possible embodiment. As used herein, the term "gaming voucher" refers generically to both conventional paper vouchers and virtual vouchers.

In certain implementations, the gaming system 600 is a retrofit gaming system based on a legacy gaming system that was originally designed to support paper vouchers, but not virtual vouchers, such as the virtual vouchers described in the '686 application or earlier in this specification in the context of FIGS. 1-5, and which has been upgraded to support the functionality described below. In particular, the gaming system 600 of FIG. 6 has a legacy ticket server 610 that maintains an associated legacy voucher database 612, a transaction server 620 that maintains an associated reporting database 622, one or more instances of kiosk 630, and one or more (and typically many) instances of gaming machine 640, each having a Bluetooth low energy (BLE) peripheral device 642 and a unique tag 644. Note that, as far as the technology is concerned, the ticket server 610 and/or the transaction server 620 need not be physically located on the casino premises, although legal regulations often require at least the ticket server 610 to be physically located on the casino premises.

In certain other implementations, the gaming system 600 is provisioned with original OEM (original equipment manufacturer) components that were originally designed and built to support the functionality of system 600 described herein.

Also shown in FIG. 6 are the cell phone 650 of a casino patron and banking networks 624, all of which communicate with various components of the gaming system 600, but which are themselves not considered to be part of that system. The cell phone 650 runs a specially designed cell-phone application (referred to herein as the "gaming app") that supports the functionality described in this specification associated with the gaming system 600. When the specification describes certain operations performed by the patron's cell phone 650, it should be understood that those operations are performed by the gaming app running on that cell phone. Although the gaming system 600 is described in the context of the cell phone 650, those skilled in the art will understand that the gaming system 600 can operate with any suitable wireless device, such as (without limitation) a cell phone, a tablet, a laptop computer, a smart watch, a fitness tracker, a smart band, a smart medallion, or a smart key fob.

The ticket server 610/voucher database 612 may be any suitable legacy ticket server/voucher database for casinos, including (without limitation) an EZ Pay ticket server from IGT of Reno, Nev.; an SDS, SDG, or ACSC ticket server from Bally Technologies Inc. of Enterprise, Nev.; a SYNKROS ticket server from Konami Gaming, Inc., of Las Vegas, Nev.; or an Oasis ticket server from Aristocrat Technologies, Inc., of Las Vegas, Nev. The ticket server 610 creates a gaming voucher by assigning a unique voucher ID to a specified monetary value and storing the voucher ID and the monetary value for the gaming voucher as related entries in a table of the voucher database 612. In the gaming system 600 of FIG. 6, there is no distinction made between paper vouchers and virtual vouchers; they are all just gaming vouchers. Unlike in the '686 application, there are no paper voucher IDs having a common subfield value that identifies those voucher IDs as being associated with paper vouchers and no virtual voucher IDs having a different, common subfield value that identifies those voucher IDs as being associated with virtual vouchers. Rather, there are only gaming vouchers created and stored by the legacy ticket server 610 in the same way as legacy paper vouchers.

The kiosk 630 may be based on any suitable kiosk designed for casinos, including (without limitation) an LSK series kiosk from Global Payments Gaming Services, Inc., of Las Vegas, Nev.; an Everi kiosk from Everi Holdings Inc. of Las Vegas, Nev.; an M3T kiosk from M3 Technology Solutions, LLC, of Norman, Okla.; or a suitable kiosk from any of NRT Technology Corp. of Canada; Glory Global Solutions Limited of Japan; Automated Systems America, Inc., of Glendale, Calif.; or Diebold Nixdorf, Inc., of North Canton, Ohio. Depending on the particular implementation, the kiosk 630 may be based on a legacy kiosk whose software has been upgraded to support the functionality of system 600 or the kiosk 630 may be a new OEM kiosk that was originally designed and built to support that functionality.

The gaming machine 640 may be based on any suitable gaming machine for casinos, including (without limitation) a suitable gaming machine from any of IGT of Reno, Nev.; Scientific Games Corporation of Las Vegas, Nev.; Aristocrat Technologies, Inc., of Las Vegas, Nev.; Konami Gaming, Inc., of Las Vegas, Nev.; Ainsworth Game Technology Inc. of Las Vegas, Nev.; or Everi Holdings Inc. of Las Vegas, Nev. Here, too, depending on the particular implementation, the gaming machine 640 may be based on a legacy gaming machine that has been upgraded to support the functionality of system 600 (as described further below) or the gaming machine 640 may be a new OEM gaming machine that was originally designed and built to support that functionality.

Depending on the implementation, the tag 644 has associated with it a unique tag ID. The tag 644 may be affixed to or mounted onto an outer surface of the gaming machine 640, e.g., on or near the input panel or mounted inside the gaming machine 640 itself, e.g., behind or near the input panel. The tag 644 may be (i) an optically readable tag that represents the tag ID using an optically readable code symbol, such as (without limitation) a one-dimensional barcode or a two-dimensional QR code, or (ii) a wirelessly readable tag, such as (without limitation) an RFID or NFC tag, that wirelessly transmits the tag ID, or any other suitable means for conveying the tag ID to the cell phone 650. Depending on the particular type of wireless tag used, the reading of the tag 644 by the cell phone 650 may involve two-way wireless communication (i.e., a query by the cell phone 650 followed by a response by the tag 644) or one-way wireless communication (i.e., the cell phone 650 detecting a beacon transmitted by the tag 644).

When the tag 644 is an optically readable tag, the cell phone 650 is able to optically read the code symbol to determine the tag ID. When the tag 644 is a wirelessly readable tag, the cell phone 650 is able to receive and process the RF signal transmitted by the tag 644 to determine the tag ID. In either case, the tag ID uniquely identifies and distinguishes the gaming machine 640 from all other gaming machines in the casino, each of which is analogous to the gaming machine 640 and has its own unique tag. Note that the tag 644 may be both an optically readable tag having a code symbol representing the tag ID and a wirelessly readable tag that transmits a wireless signal representing that same tag ID.

As indicated in FIG. 6, various other elements of the gaming system 600 are able to communicate with one another via suitable wireline and/or wireless links. In particular, the cell phone 650 and the kiosk 630 are each able to communicate with the transaction server 620 via the wireless communication network 602, which can be a conventional Bluetooth network or other suitable wireless network. In some implementations, the wireless network 602 is a private wireless network designed and configured to handle the expected volume of wireless communications within the gaming system 600. The transaction server 620 also capable of communicating with the one or more banking networks 624 via suitable wireline and/or wireless links. The ticket server 610 is able to communicate with both the kiosk 630 and the gaming machine 640 via suitable wireline or wireless links 604 and 606, respectively. The cell phone 650 is also able to communicate wirelessly via BLE communication link 608 with the gaming machine's BLE peripheral device 642, which, as described further below, is electrically connected to the gaming machine 640. Although the BLE peripheral device 642 is a wireless transceiver designed to communicate with the cell phone 650 via the Bluetooth low-energy link 608, in other implementations, other suitable wireless transmission protocols may be employed, such as (without limitation) NFC (near-field communication), Bluetooth, WiFi, ZigBee, or optical protocols.

The gaming system 600 enables a patron to use his cell phone 650 to request and facilitate the transfer of gaming credit (i.e., funds) corresponding to a specified monetary value to the gaming machine 640 selected by the patron to enable the patron to play the gaming machine 640 without having physically to insert into the gaming machine, money or other financial transaction means such as (without limitation) a paper TITO ticket, a player card, a credit/debit bank card. Note that, as described below and unlike a conventional virtual or electronic wallet (aka e-wallet), at no time during this process, do the funds associated with the gaming credit ever reside on the cell phone 650 itself or in an account associated with the patron. Moreover, at no time does the cell phone 650 or the patron have access to the voucher ID of any gaming voucher purchased by the patron or on behalf of the patron using the cell phone 650.

Prior to the operations associated with an individual transfer of gaming credit to the patron's selected gaming machine 640, the patron registers with the transaction server 620, which creates a user profile for the patron in the reporting database 622. The user profile includes a unique user ID associated with the patron, a unique cell phone ID associated with the patron's cell phone 650, information regarding one or more funding sources (for example, without limitations, credit or debit card bank accounts, existing gaming vouchers stored in the voucher database 612, or an e-wallet) for the patron, and authentication information for the patron (for example, without limitation, a PIN (personal identification number), finger print, thumb print, voice print, face print, retina print, transaction DNA, block chain, token, and/or certificate associated with the patron).

The transaction server 620 also maintains in the reporting database 622, for each registered patron, a transaction ledger that documents the transactions performed by the patron using the cell phone 650, where, for each transaction, the transaction ledger includes the voucher ID of the gaming voucher created for the transaction, the monetary value of the transaction, the type of the transaction (e.g., crediting a gaming machine vs. other types of transactions), a date-and-time stamp for the transaction, and a location associated with the transaction (e.g., the tag ID of the gaming machine's tag 644). With at least one viable funding source registered with the transaction server 620, the patron is able to use his cell phone 650 to have gaming credit transferred to the gaming machine 640 for use by the patron to play the gaming machine's game, according to the processing described below. When the patron's user profile identifies multiple funding sources, the patron can use the cell phone 650 to select a default funding source and be queried by the transaction server 620 to select a different funding source if the default funding source is deficient.

Figure 7:
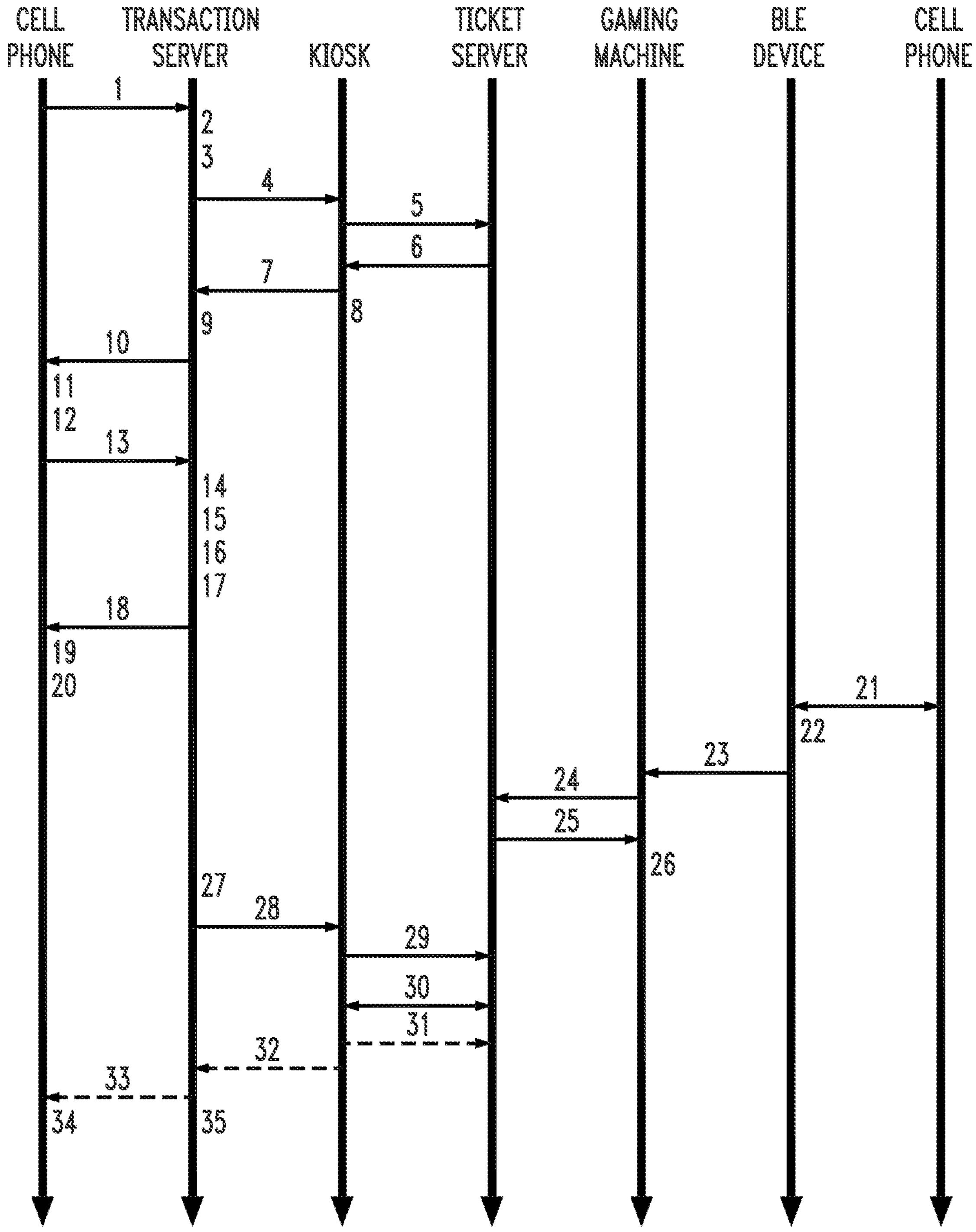
FIG. 7 is a diagram representing the steps involved in the purchase by a patron of gaming credit at the gaming machine of the gaming system of FIG. 6, according to one possible implementation.

FIG. 7 is a diagram representing the steps involved in the purchase by a patron of gaming credit at the gaming machine 640 of the gaming system 600 of FIG. 6, according to one possible implementation.

At step 1, the patron uses the gaming app on his cell phone 650 to transmit a gaming-credit purchase request via the wireless network 602 to the transaction server 620 to begin the process of having gaming credit transferred to a to-be-specified gaming machine on behalf of the patron. The purchase request includes the cell phone ID, the desired monetary value of the requested gaming credit, and authentication information for the patron.

At step 2, the transaction server 620 accesses the patron's user profile in the reporting database 622 using the received cell phone ID and determines whether to authorize the patron's purchase request by (i) comparing the received authentication information with the patron's authentication information stored in the patron's user profile and (ii) determining whether the requested monetary value is acceptable (e.g., within specified limits previously established by and/or for the patron).

Assuming that the purchase request is authorized, at step 3, the transaction server 620 creates a new transaction record in the patron's transaction ledger in the reporting database 622 for the new transaction and records the monetary value in the new transaction record. The transaction server 620 assigns a unique transaction ID that contains the patron's user ID and stores that transaction ID in the transaction record. Assigning a unique transaction ID associated with each transaction associated with the cell phone's unique ID enables the transactions to be uniquely batched and tracked using duplicate ledgers, where batch handling and backups can be continuously updated and appended without duplication.

At step 4, the transaction server 620 transmits a kiosk voucher request via the wireless network 602 to the kiosk 630, where the kiosk voucher request includes the transaction ID and the monetary value.

At step 5, the kiosk 630 receives the kiosk voucher request and transmits a ticket-server voucher request via the communication link 604 to the ticket server 610, where the ticket-server voucher request includes (at least) the monetary value and a local date-and-time stamp. Those skilled in the art will understand that some ticket servers may require additional information, such as (without limitation) a unique kiosk ID associated with the kiosk 630. The kiosk 630 maintains a voucher-request ledger that maps the kiosk voucher request received from the transaction server 620 to the ticket-server voucher request that the kiosk 630 sent to the ticket server 610.

At step 6, upon receiving the ticket-server voucher request from the kiosk 630, the ticket server 610 creates a new gaming voucher having the monetary value specified in the ticket-server voucher request, by (i) assigning a unique voucher ID, (ii) storing the voucher ID, the monetary value, the date-and-time stamp, and (if appropriate) the kiosk ID in the voucher database 612, and (iii) transmitting the voucher ID and the received date-and-time stamp via the communication link 604 to the kiosk 630.

At step 7, the kiosk 630 uses the received date-and-time stamp to retrieve the corresponding transaction ID from its local memory and transmits the voucher ID and the transaction ID via the wireless network 602 to the transaction server 620.

At step 8, the kiosk 630 starts a voucher-redemption timer having a specified duration (e.g., 3 seconds) for the new gaming voucher. If the voucher-redemption timer expires before the new gaming voucher is redeemed, then the kiosk 630 takes steps to cancel the transaction. These steps are described below with respect to steps 30-35.

At step 9, the transaction server 620 uses the transaction ID received from the kiosk 630 in step 7 to identify the corresponding transaction record in the patron's transaction ledger in the reporting database 622 and adds the received voucher ID to that transaction record.

At step 10, the transaction server 620 transmits to the cell phone 650 via the wireless network 602, a message indicating that a new gaming voucher has been successfully created for the requested transaction and that the patron needs to identify the gaming machine 640 that the patron wants to play.

At step 11, as instructed by the cell phone 650, the patron uses the cell phone 650 to read the tag ID associated with the tag 644 mounted on the gaming machine to be credited.

In a casino with many instances of the gaming machine 640, each having an instance of the BLE peripheral device 642, the cell phone 650 will simultaneously receive multiple BLE signals from nearby gaming machines 640. In order to read the tag 644 of the desired gaming machine 640, the patron places the cell phone 650 near that tag 644, thereby improving the probability that the BLE signal from the BLE peripheral device 642 of that gaming machine 640 will have a received signal strength at the cell phone 650 that is greater than the individual received signal strengths of the BLE signals from the BLE peripheral devices 642 of all of the other gaming machines 640 in the casino. When the cell phone 650 reads the tag 644, at step 12, the cell phone 650 selects the BLE signal with the strongest signal level and stores the peripheral device ID (e.g., the serial number of the BLE peripheral device 642) contained in that signal.

At step 13, the cell phone 650 transmits the tag ID, the transaction ID, and the phone ID to the transaction server 620 via the wireless network 602.

At step 14, the transaction server 620 adds the tag ID to the transaction record in the patron's transaction ledger in the reporting database 622. The transaction server 620 identifies the transaction ledger for the patron using the transaction ID and the phone ID received from the cell phone 650.

The transaction server 620 maintains a tag ID table registered by the casino, that maps tag IDs to peripheral device IDs and the type of transaction (e.g., funding a gaming machine vs. a different type of transaction). At step 15, the transaction server 620 uses the tag ID received from the cell phone 650 to access the tag ID table to determine if the type of transaction is funding a gaming machine. If so, then, at step 16, the transaction server 620 retrieves from the tag ID table, the peripheral device ID associated with the received tag ID. Note that the tag ID table also stores, for each tag, a business ID identifying the casino and an encryption key for the peripheral device 642 (if encryption is supported, as described below for step 17).

At step 17, the transaction server 620 generates a transaction package for the transaction. As used herein, the term "transaction package" is a formatted message that represents (at least) the voucher ID of the gaming voucher for the transaction. In one possible implementation, the transaction package contains the unencrypted voucher ID. In another possible implementation, the transaction package contains an encrypted value representing the voucher ID. In yet another possible implementation, the transaction package contains the unencrypted voucher ID and the unencrypted monetary value associated with that voucher ID. In a preferred implementation of FIG. 6, the transaction package is a tokenized transaction package (UP) message that contains an encrypted value representing (at least) both the voucher ID and its monetary value. Those skilled in the art will understand how to select and apply a suitable encoding technique to generate encrypted values. Those skilled in the art will also understand that other implementations employ other suitable techniques for generating encrypted or unencrypted transaction packages. As used herein, the term "tokenized" implies that one or more sensitive data elements are represented in the TTP message by non-sensitive equivalents, referred to as tokens, that have no extrinsic or exploitable meaning or value. A token is a reference (i.e., identifier) that maps back to the sensitive data through a tokenization system. The mapping from original data to a token uses a method that renders tokens infeasible to reverse in the absence of the tokenization system. In the preferred implementation of FIG. 6, tokenization is achieved using a suitable encryption technique that replaces sensitive data elements, such as the voucher ID and its corresponding monetary value, with corresponding encrypted values.

At step 18, the transaction server 620 transmits the TTP message along with the retrieved peripheral device ID to the cell phone 650 via the wireless network 602.

At step 19, the cell phone 650 compares the peripheral device ID received from the transaction server 620 to the stored peripheral device ID associated with the previously selected, strongest received BLE signal.

If there is not a match, then, at step 20, the cell phone 650 instructs the patron to move the cell phone 650 closer to the tag 644 then re-selects the BLE signal having the strongest received signal strength. Processing then returns to step 19. Moving the cell phone 650 closer to the tag 644 improves the probability that the strongest received BLE signal will be from the BLE peripheral device 642 of the selected gaming machine 640. The processing of steps 19 and 20 continues until the peripheral device IDs compared in step 19 match. If the IDs do not match quickly enough, then the voucher-redemption timer in the kiosk 630 will time out, the kiosk 630 will redeem the voucher (as described previously), and the cell phone 650 will instruct the patron to try again.

If and when there is a match, at step 21, the cell phone 650 establishes a Bluetooth connection with the BLE peripheral device 642 of the selected gaming machine 640 and transmits the TTP message to the BLE peripheral device 642. Note that the cell phone 650 does not decrypt the TTP message. As such, neither the cell phone 650 nor the patron has access to the voucher ID.

At step 22, the BLE peripheral device 642 decrypts the received TTP message to recover the monetary value and the voucher ID.

At step 23, the BLE peripheral device 642 transmits the voucher ID and the monetary value to the gaming machine 640, which adds the monetary value to its running total of all of the recent purchases of its gaming credit.

Note that, in an alternative implementation, the bill validator of the gaming machine 640, and not the BLE peripheral device 642, decrypts the received TTP message to recover the monetary value and the voucher ID. In that case, steps 22 and 23 will instead involve the BLE peripheral device 642 transmitting the TTP message to the gaming machine's bill validator, which then decrypts the TTP message.

At step 24, the gaming machine 640 transmits the voucher ID to the ticket server 610 via the communication link 606.

At step 25, the ticket server 610 accesses the voucher database 612 to retrieve the monetary value associated with the received voucher ID and transmits the retrieved monetary value to the gaming machine 640.

At step 26, the gaming machine 640 increases its gaming credit by the received monetary value, thereby enabling the patron to play or continue to play the gaming machine 640.

In one implementation, a transaction-funding business that operates the transaction server 620 is a check underwriting service that keeps track of all of the different operations and gets paid off-line, as needed, by the casino and/or the different patrons. If the patron's funding source for the transaction was a credit/debit bank card, then, at step 27, the transaction server 620 communicates with the appropriate banking network 624 to reimburse the transaction-funding business that operates the transaction server 620 for paying for the gaming credit using conventional bank-to-bank ACH (automated clearing house) processing. If the patron's funding source was a different, previously created, but never redeemed gaming voucher, then, at step 28, the transaction server 620 instructs a kiosk, such as the kiosk 630, to redeem that voucher with the ticket server 610 at step 29. Note that fees may be charged by different entities to support the operations of the gaming system 600. For example, the transaction server 620 may charge a fee to the patron and/or the casino for each transaction.

When the voucher-redemption timer that was set in step 8 expires, at step 30, the kiosk 630 queries the ticket server 610 about the existence of the gaming voucher, and the ticket server 610 responds by confirming whether or not the gaming voucher still exists. Under normal circumstances, using processing described above, the gaming voucher will be redeemed by the gaming machine 640 well before the voucher-redemption timer times out, in which case, the ticket server 610 will respond to the kiosk 630 by indicating that the gaming voucher is no longer valid. In that case, the kiosk 630 assumes that the gaming machine 640 properly redeemed the gaming voucher and so the kiosk 630 takes no further corrective actions.

If, however, the ticket server 610 indicates to the kiosk 630 that the gaming voucher is still valid, then the kiosk 630 determines that something has gone wrong and takes action to un-do the transaction. In particular, at step 31, the kiosk 630 transmits a request to the ticket server 610 to redeem the gaming voucher, and the ticket server 610 erases or otherwise cancels the gaming voucher in the voucher database 612 and transmits the corresponding monetary value to the kiosk 630. At step 32, the kiosk 630 then instructs the transaction server 620 to cancel or reverse the transaction. At step 33, the transaction server 620 (i) transmits a message via the wireless network 602 to the cell phone 650 indicating that the cell phone's gaming-credit purchase request has failed and (ii) updates the patron's transaction ledger accordingly. At step 34, the cell phone 650 informs the patron that the request for gaming credit has failed and (optionally) asks the patron to try again. If necessary, at step 35, the transaction server 620 also sends a message to the appropriate banking network 624 to reverse the transaction.

In one retrofit implementation, a legacy gaming system is upgraded to provide the gaming system 600 of FIG. 6, where the legacy casino system already had one or more legacy kiosks, one or more legacy gaming machines, a legacy ticket server, and a legacy voucher database, where the upgrading involves:

- Modifying the software of each legacy kiosk to provide each instance of the kiosk 630 of FIG. 6;
- Modifying each legacy gaming machine to provide each instance of the gaming machine 640 of FIG. 6 by (i) affixing an instance of the tag 644 to the legacy gaming machine and (ii) electrically connecting an instance of the BLE peripheral device 642 to the legacy gaming machine as described further below; and
- Adding the transaction server 620 and the reporting database 622 to the legacy gaming system.

Note that the hardware of the kiosk 630 does not need to be modified. Furthermore, neither the software nor the hardware of the legacy ticket server and the legacy voucher database need to be modified at all, such that the ticket server 610 is the legacy ticket server and the voucher database 612 is the legacy voucher database.

Figure 8:
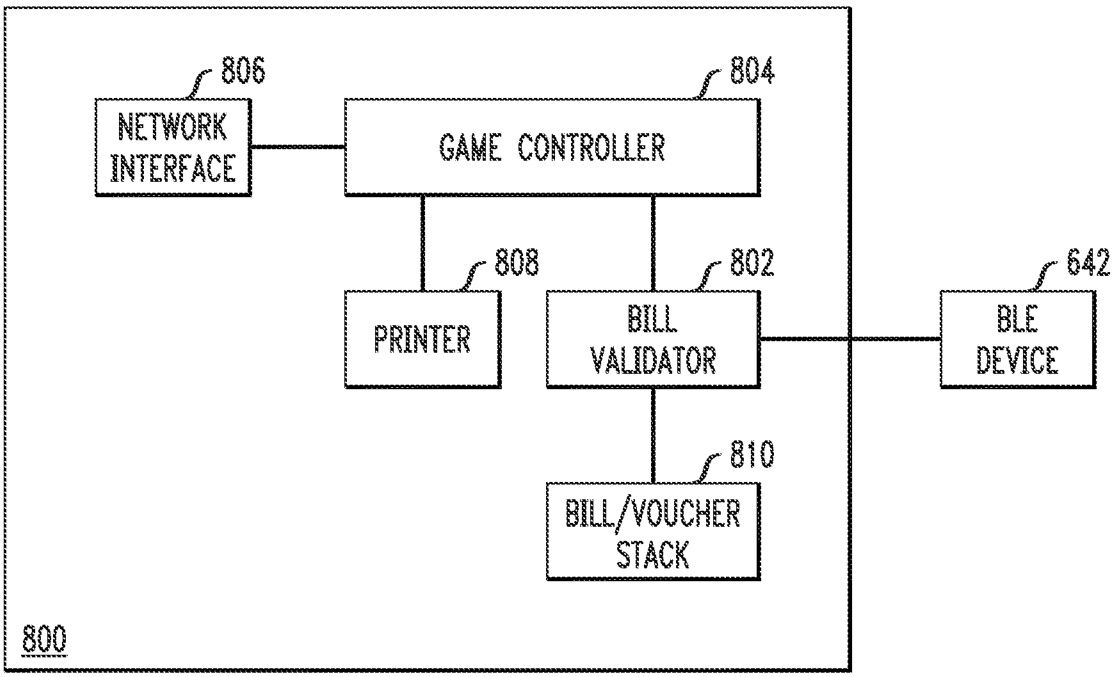
FIG. 8 is a simplified block diagram of the gaming machine of FIG. 6.

FIG. 8 is a simplified block diagram of the gaming machine 640 of FIG. 6. In FIG. 8, block 800 corresponds to a legacy gaming machine that was modified to provide the gaming machine 640. In one implementation, the legacy gaming machine was modified by updating the legacy bill validator and adding the BLE device 642. The updating of the legacy bill validator may involve (i) modifying the software of the legacy bill validator to provide the bill validator 802 of FIG. 8 or (ii) replacing the legacy bill validator with the bill validator 802. As represented in FIG. 8, the BLE peripheral device 642 is electrically connected to the bill validator 802. In one possible implementation, the BLE peripheral device 642 is electrically connected to the transmit wire, the receive wire, and the reference ground wire of a TTL (transistor-transistor logic) serial bus that also interconnects the game controller 804 and the bill validator 802. Note that, in some implementations, neither the hardware nor the software of any of the game controller 804, the network interface 806, and the printer 808 of the legacy gaming machine needs to be modified. In an embodiment in which the legacy gaming machine already had a so-called smart bill/voucher stack that can track a running total of all of the recent purchases of gaming credit at the gaming machine, neither the hardware nor the software of the legacy bill/voucher stack needs to be modified to provide the bill/voucher stack 810 of FIG. 8. Otherwise, the legacy bill/voucher stack will need to be upgraded by either modification or replacement.

As understood by those skilled in that art, the game controller 804 controls the operations of the game that is played on the gaming machine 640, the network interface 806 enables the gaming machine 640 to communicate with the ticket server 610 of FIG. 6 and possibly other nodes in the gaming system 600, the printer 808 enables the gaming machine 640 to print paper vouchers based on remaining gaming credit, and the bill validator 802 enables the gaming machine 640 to receive cash and paper vouchers to add gaming credit.

As described previously with reference to step 23, the BLE peripheral device 642 transmits the voucher ID and the monetary value to the gaming machine 640. In particular, the BLE peripheral device 642 transmits the voucher ID and the monetary value to the bill validator 802, which (i) forwards the voucher ID to the game controller 804 in a way that is identical to how a legacy bill validator would forward a voucher ID associated with a received paper voucher to a legacy game controller and (ii) forwards the monetary value to the bill/voucher stack 810 in a way that is identical to how a legacy bill validator would forward a monetary value for a received paper voucher to a legacy, smart bill/voucher stack. The game controller 804 forwards the voucher ID to the network interface 806, and the network interface 806 transmits the voucher ID to the ticket server 610 of FIG. 6, again in ways that are identical to how legacy game controllers and legacy network interfaces operate for voucher IDs of paper vouchers. Similarly, the network interface 806 receives a monetary value from the ticket server 610 and forwards that monetary value to the game controller 804, which increases its gaming credit by the monetary value, all in ways that are identical to how legacy network interfaces and legacy game controllers operate for monetary values of paper vouchers.

Note that the kiosk 630 and the gaming machine 640 still support all of the legacy functionality associated with paper vouchers, including paper-based cash-in and cash-out operations.

Although the operations of the gaming system 600 have been described in the context of the gaming machine 640 of FIGS. 6-8, which has a bill validator 802, a bill/voucher stack 810, and a printer 808, in alternative implementations, a gaming system could have one or more completely paperless gaming machines that do not have any of those three components in addition to or instead of instances of the gaming machine 640. Instead, each paperless gaming machine would have a wireless transceiver that can communicate directly with the cell phone 650 and with the game controller 804.

Although the operations of the gaming system 600 have been described in the context of funding gaming credit at gaming machines such as (without limitation) slot machines and electronic poker machines, in certain implementations, the gaming system 600 can also support funding gaming credit at gaming tables such as (without limitation) blackjack tables and roulette tables. In those implementations, the transaction server 620 is able to instruct a voucher printer (not shown in FIG. 6) located at or near a gaming table to print a paper voucher for the transaction based on the gaming voucher created by the ticket server 610. The gaming table would have a tag analogous to the gaming machine's tag 644 that the patron would read with his/her cell phone 650 to identify the gaming table to the transaction server 620. The dealer at the gaming table would redeem the paper voucher using a conventional legacy operation and provide corresponding conventional playing chips to the patron. The voucher printer may be any suitable voucher printer for casinos, including (without limitation) a suitable voucher printer from JCM American Corporation of Las Vegas, Nev.; TransAct Technologies Incorporated of Hamden, Conn.; FutureLogic, Inc., of Glendale, Calif.; or Nanoptics, Inc., of Gainesville, Fla. Note that, if the gaming table has a (wireline or wireless) smart can that can communicate directly with the transaction server, then the voucher printer and the paper voucher can potentially be omitted from this implementation while still supporting the funding of gaming credit at the gaming table using the patron's cell phone 650.

BLE Peripheral Device Slot Interface

This section provides implementation details for the slot interface of a BLE peripheral device 642 according to one possible implementation of the gaming system 600 of FIGS. 6-8. The peripheral device slot interface provides a mechanism whereby a Bluetooth-enabled cell phone 650 transmits a tokenized transaction package (TTP) message to a selected gaming machine 640, which unbundles/decrypts the TTP message and forwards the recovered voucher ID to the gaming machine's game controller 804, which follows a legacy process for redeeming gaming vouchers and driving gaming credits to the gaming machine 640. The BLE peripheral device 642 and the cell phone 650 use a suitable Bluetooth low-energy communication protocol as their wireless network technology. Data is sent and received using standard GATT (Generic Attribute Profile) services and characteristics.

As described previously, the gaming system 600 enables a casino patron to purchase a gaming voucher using the cell phone 650 and have the corresponding gaming credit applied securely to a selected gaming machine 640 without the use of a paper ticket or currency. The patron interacts with the gaming machine's BLE peripheral device 642 and the transaction server 620 using a custom application installed on the patron's BLE-enabled cell phone 650.

The BLE peripheral device 642 is connected to the gaming machine's bill validator 802 within the locked cabinet of the gaming machine 640 such that radio signals can propagate through the cabinet to and from the BLE peripheral device 642. The BLE peripheral device 642 is near other instances of the BLE peripheral device 642, which broadcast the same advertised GATT Service. The proximity of nearby BLE peripheral devices is dependent on the layout of the casino floor and the positioning of the BLE peripheral device 642 within each gaming machine cabinet.

Each instance of the BLE peripheral device 642 is registered with the transaction server 620, which stores the following information in the reporting database 622 for each instance: a business ID identifying the casino, the serial number of the BLE peripheral device 642, and an encryption key for the BLE peripheral device 642 (if encryption is supported).

The patron has registered the cell phone 650 with the transaction server 620, and the cell phone 650 is capable of receiving a valid TTP message (containing the purchased voucher ID and the associated monetary value) from the transaction server 620. As described previously, the transaction server 620 has access to the kiosk 630, which in turn has access to the ticket server 610. The location of the casino is identified via a combination of assisted GPS plus the use of BLE beacons that are placed in the areas of the casino containing instances of the gaming machine 640, each of which is equipped with a BLE peripheral device 642 connected to its bill validator 802.

When the patron uses the cell phone 650 to read the tag 644 of a particular gaming machine 640, the cell phone 650 will be physically very near the BLE peripheral device 642 of that gaming machine 640. The typical distance between the cell phone 650 and the front of the gaming machine 640 is about 6 to 8 inches, with some transactions performed with the cell phone 650 almost directly on the front of the gaming machine 640 and other transactions with the cell phone 650 as far away as 12 inches. It is not expected that any transaction will be performed with the cell phone 650 more than 24 inches from the face of the selected gaming machine 640.

Unless the BLE peripheral device 642 has been connected to a cell phone 650 and is processing a TTP message, the BLE peripheral device 642 is repeatedly advertising its service by broadcasting its unique peripheral device ID, its transmit (TX) power level, the shared 128-bit Universal Unique Identifier (UUID) for the transaction service (i.e., purchasing gaming credit), and service data. The cell phone 650 measures the power level of the received (RX) signal and compares that measured RX power level to the received TX power level to estimate the distance from the cell phone 650 to the BLE peripheral device 642. The service data includes (at least) the manufacturer code and version number for the BLE peripheral device 642.

One exception is if the cell phone 650 connects and sends invalid data to the BLE peripheral device 642 three times consecutively; at which point, the BLE peripheral device 642 shuts down for one hour, driving a legacy suspected fraud response from the gaming machine 640. If the cell phone 650 connects but no data is received within 5 seconds, then the BLE peripheral device 642 disconnects and resumes advertising. The BLE peripheral device 642 connects to only a single cell phone 650 at a time; during which, the BLE peripheral device 642 stops advertising.

The following procedure is performed each time the patron requests funds for the purpose of transferring gaming credit to a gaming machine 640. Using the casino application on the cell phone 650, the patron selects an option to transmit to the transaction server 620 a request for a TTP message that will be used to drive gaming credit to a selected gaming machine 640. The transaction server 620 interfaces with the kiosk 630, which in turn interfaces with the ticket server 610 to purchase a gaming voucher with a corresponding monetary value. The transaction server 620 bundles the authorized gaming voucher and associated information into a TTP message that is transmitted to the cell phone 650. TTP messages are short-lived and, if not redeemed by the selected gaming machine 640 within a specified time limit, will be auto-redeemed (reversed) back into the patron's account by the kiosk 630.

The patron uses the cell phone 650 to read the tag ID of the tag 644 on the selected gaming machine 640. The cell phone 650 transmits the tag ID to the transaction server 620, which uses the tag ID to access the reporting database 622 to retrieve and transmit back to the cell phone 650, the peripheral device ID associated with that same gaming machine 640. The cell phone 640 immediately begins to scan for nearby BLE peripheral devices 642. When the cell phone 650 determines that a nearby BLE peripheral device 642 is broadcasting the correct service UUID and a peripheral device ID that matches the peripheral device ID received from the transaction server 620, the cell phone 650 transmits a connection request to establish a connection with that BLE peripheral device 642.

If an encryption key exists for the BLE peripheral device 642, then the cell phone 650 exchanges random cryptographic data with the BLE peripheral device 642 to enable the cell phone 650 and the BLE peripheral device 642 to generate respective copies of an Initialization Vector (IV) that are exchanged between the two devices to secure a connection. If an encryption key is associated with the BLE peripheral device 642, then the TTP message will be encrypted using that encryption key; otherwise, the TTP message is non-encrypted.

The cell phone 650 transmits the TTP message to the BLE peripheral device 642 by writing the TTP message to a first specified characteristic "with response." The BLE peripheral device 642 unbundles/decrypts the received TTP message to recover the voucher ID and the associated monetary value and transmits the monetary value back to the cell phone 650. Provided that the write of the TTP message is successful and the monetary value received from the BLE peripheral device 642 matches the monetary value originally requested by the cell phone 650, the cell phone 650 waits to be notified of an available response code on a second specified characteristic. The cell phone 650 continues to wait to be notified of a change in value of this response code until its length is non-zero, or until 10 seconds have elapsed. Example response codes are identified in the following table. If the BLE peripheral device 642 is not capable of sending any feedback data to the cell phone 650, then the BLE peripheral device 642 returns “00” as the default setting for the characteristic.

RESPONSE CODES

| Code | Name | Description |
|---|---|---|
| 00 | Success | The voucher has the correct format, has been presented to the gaming machine for redemption, and, in some implementations, has been successfully redeemed. |
| 01 | Immediate Duplicate | The voucher is a duplicate of the immediately previous voucher, which was successfully presented and redeemed. |
| 02 | Prior Duplicate | The voucher is a duplicate of a previously redeemed voucher, but not the immediately presented and redeemed voucher. |
| 03 | Format Error | The voucher has an invalid format. |
| 04 | Not-Found Error | The voucher does not exist in the voucher database. |
| 05 | System Error | A system error was detected, and the voucher could not be presented to the gaming machine. |
| 06 | Decryption Error | A decryption error was detected when decrypting TTP message the voucher, and the voucher could not be presented to the gaming machine. |
| 99 | Other Error | An unexpected or unclassified error was encountered, and the voucher could not be presented to the gaming machine. |

After the response code is read, the cell phone 640 will issue a disconnect request to the BLE peripheral device 642, at which time, the BLE peripheral device 642 immediately begins advertising for another connection request. In some implementations, if the response code returned from the BLE peripheral device 642 is “00,” then the cell phone 650 verifies that the gaming voucher has actually been redeemed by the gaming machine 640 by the cell phone 650 querying the ticket server 610 via the interface to the kiosk 630.

Generalized Transactions

Although embodiments have been described in the context of funding gaming credit at a gaming machine in a casino, the underlying technology can be employed in a wide variety of different types of transactions (i.e., the purchase or rental of goods and/or services). Note that the provision of gaming credit or any other type of credit to a patron is considered to be a type of good. In one possible generalization, the underlying technology can be employed for any transaction conducted by a patron at a touchpoint (i.e., a physical location) of a touchpoint business using a cell phone (or other suitable wireless device). A transaction server is deployed to authorize transactions at touchpoints and maintain a ledger to track all transactions facilitated by the transaction server. Note that the wireless device may be owned and used by the patron to facilitate the transaction. In that case, the transaction server can identify the patron from the wireless device ID received from the wireless device. Alternatively, the wireless device may be used by the patron to facilitate the transaction, where the wireless device is not owned by patron. In that case, the transaction server receives suitable additional information to identify the patron. This additional information may include patron-authentication information. In the casino scenario of FIGS. 6-8, the selected gaming machine 642 is the touchpoint, and the tag ID is the touchpoint ID associated with the touchpoint. In a generic scenario:

The patron uses a wireless device to transmit patron-identifying information to a transaction server operated by a transaction-funding business;

The patron uses the wireless device to read a touchpoint ID associated with the touchpoint;

The wireless device transmits the touchpoint ID to the transaction server;

The transaction server authorizes the transaction;

The transaction server transmits authorization for the transaction to at least one of the wireless device and the touchpoint business;

The touchpoint business provides at least one of a good and a service associated with the transaction to the patron.

Authorizing the transaction may involve transmitting a message back to the cell phone indicating that the transaction has been authorized and/or transmitting the touchpoint ID to the touchpoint business to identify the touchpoint for the transaction. In certain implementations, the transaction-funding business pre-funds the transaction to the touchpoint business on behalf of the patron and then subsequently gets reimbursed by the patron for the cost of the transaction similar to a bank credit card account. The pre-funding may involve a maximum monetary value for the transaction. In other implementations, the transaction-funding business may be pre-funded by the patron similar to a bank debit card account. Alternatively, although the transaction-funding business provides the touchpoint business with a guarantee that the touchpoint business will be compensated for the transaction, the patron may instead elect to pay the touchpoint business directly for the transaction, e.g., using cash or a bank credit/debit card. The steps involved in ensuring that the transaction has been authorized may include (i) actions that result in the transfer of outgoing funds for the transaction from a transaction-funding business that operates the transaction server to the touchpoint business associated with the touchpoint and (ii) actions that result in the transfer of incoming funds from one of the patron’s funding sources to pre-fund or reimburse the transaction-funding business for the funds for the transaction.

As a particular example, assume that the transaction is the purchase of gasoline by the patron at a selected pump of a particular gas station. Instead of inserting a credit/debit bank card into the pump, the patron uses his/her cell phone to (i) read a tag mounted onto the pump and (ii) wirelessly transmit the tag ID along with patron-identifying information (e.g., the cell phone ID and patron-authentication information) to a transaction server operated by a transaction-funding business. The transaction server maintains (i) a user profile for the patron that includes the patron’s cell phone ID and at least one funding source for the patron (e.g., the patron’s credit/debit card number) and (ii) a business profile for the gas station that includes the tag ID. Note that both the patron and the gas station operator have previously registered with the transaction-funding business to establish their respective profiles.

The transaction server uses (i) the cell phone ID to identify the patron and (ii) the tag ID to identify the gas station. The transaction server communicates with the gas station to authorize the purchase of gasoline by the patron at the selected pump. In one possible implementation, the pump then indicates to the patron that gasoline may be dispensed similar to the way that a conventional pump functions after the patron inserts his/her bank card. Note that, in addition, the transaction server may transmit a message to the cell phone indicating that the purchase has been authorized, and the cell phone may indicate that authorization to the patron. After the patron has dispensed the gasoline, the gas station communicates with the transaction server to request payment for the gasoline. The transaction server takes actions to transfer outgoing funds to the gas station to pay for the gasoline, e.g., using a bank account of the transaction-funding business. The transaction server also takes actions to transfer incoming funds using the patron's credit/debit bank card to reimburse the transaction-funding business for paying the gas station, thereby completing the transaction. Note that, at no time during the transaction does the gas station possess the patron's bank card number. Also, at no time does the patron's cell phone transmit the patron's bank card number to the transaction server. Nor do the funds for purchasing the gasoline ever reside on the patron's cell phone.

Those skilled in the art will understand that the technology described herein can be used to enable other types of transactions such as (without limitation) purchasing food and beverages at a restaurant, purchasing drinks at a bar, paying for table service at a club, purchasing spa services or renting cabanas or lounge chairs at a hotel or resort, paying for parking or parking valet services, tipping service employees, and providing credit to the patron for the patron to use in the future.

In certain embodiments, the invention is a method for facilitating a transaction for a patron using a wireless device at a touchpoint associated with a touchpoint business. The method comprises (a) the wireless device transmitting patron-identifying information to a transaction server operated by a transaction-funding business; (b) the wireless device reading a touchpoint ID associated with the touchpoint; (c) the wireless device transmitting the touchpoint ID to the transaction server; (d) the transaction server authorizing the transaction; and (e) the transaction server transmitting authorization for the transaction to at least one of the wireless device and the touchpoint business, and the touchpoint business providing at least one of a good and a service associated with the transaction to the patron.

In at least some of the preceding embodiments, the patron-identifying information comprises at least one of a wireless device ID associated with the wireless device and patron-authentication information for the patron.

In at least some of the preceding embodiments, the patron-identifying information comprises the wireless device ID associated with the wireless device and the patron-authentication information for the patron.

In at least some of the preceding embodiments, the method further comprises (f) the transaction-funding business compensating the touchpoint business for the transaction; and (g) the patron compensating the transaction-funding business for the transaction.

In at least some of the preceding embodiments, the method further comprises (f) the patron directly compensating the touchpoint business for the transaction.

In at least some of the preceding embodiments, the touchpoint ID is a tag ID of an optical tag, and step (a) comprises the wireless device optically reading the tag ID.

In at least some of the preceding embodiments, the touchpoint ID is tag ID of a wireless tag, and step (a) comprises the wireless device wirelessly reading the tag ID.

In at least some of the preceding embodiments, the transaction is a purchase of gaming credit at a touchpoint of a gaming establishment.

In at least some of the preceding embodiments, the touchpoint is a gaming table.

In at least some of the preceding embodiments, the touchpoint is a gaming machine; step (b) comprises the wireless device reading the touchpoint ID associated with the gaming machine; step (d) comprises the transaction server authorizing the purchase of the gaming credit; and step (e) comprises the transaction server transmitting authorization for the purchase of the gaming credit to the wireless device, and the gaming establishment providing the gaming credit to enable the patron to play the gaming machine.

In at least some of the preceding embodiments, the gaming establishment further comprises (i) a ticket server configured to generate new gaming vouchers and redeem existing gaming vouchers, wherein each existing gaming voucher is associated with a unique voucher ID and a specified monetary value, and (ii) a kiosk configured to request generation of new gaming vouchers by the ticket server and to request redemption of existing gaming vouchers by the ticket server. Step (d) comprises (d1) the transaction server transmitting to the kiosk a kiosk request for a new gaming voucher having a monetary value associated with the gaming credit; (d2) the kiosk transmitting to the ticket server the request for the new gaming voucher having the monetary value associated with the gaming credit; (d3) the ticket server generating the new gaming voucher by associating a voucher ID with the monetary value associated with the gaming credit; (d4) the ticket server transmitting to the kiosk the voucher ID associated with the new gaming voucher; and (d5) the kiosk transmitting to the transaction server the voucher ID associated with the new gaming voucher. Step (e) comprises (e1) the transaction server generating and transmitting to the wireless device a transaction package representing at least the voucher ID associated with the new gaming voucher; (e2) the wireless device transmitting the transaction package to the gaming machine; (e3) the gaming machine recovering the voucher ID associated with the new gaming voucher from the transaction package; (e4) the gaming machine transmitting to the ticket server the voucher ID associated with the new gaming voucher; (e5) the ticket server retrieving the monetary value associated with the voucher ID; (e6) the ticket server transmitting the retrieved monetary value to the gaming machine; and (e7) the gaming machine providing the gaming credit corresponding to the retrieved monetary value to enable the patron to play the gaming machine.

In at least some of the preceding embodiments, the transaction server generates the transaction package as an encrypted tokenized transaction package (TTP) message; the wireless device is not configured to decrypt the TTP message to recover the voucher ID; and the gaming machine decrypts the TTP message to recover the voucher ID.

In at least some of the preceding embodiments, the gaming machine is an upgraded gaming machine provisioned by (i) providing a legacy gaming machine having a legacy game controller, a legacy input panel, and a legacy bill validator and (ii) electrically connecting a peripheral device to the legacy bill validator, wherein the peripheral device is configured to communicate wirelessly with the wireless device and the upgraded gaming machine is provisioned without having to modify the legacy game controller or the legacy input panel.

In at least some of the preceding embodiments, step (e2) comprises (e2a) the peripheral device transmitting a peripheral device ID to the wireless device; (e2b) the wireless device determining that the peripheral device ID received from the peripheral device matches a peripheral device ID received from the transaction server; and (e2c) the wireless device transmitting the transaction package to the gaming machine.

In some embodiments, the invention is a gaming establishment comprising the ticket server, kiosk, and the gaming machine of at least some of the preceding embodiments.

In some embodiments, the invention is a gaming machine of at least some of the preceding embodiments.

In some embodiments, the invention is a wireless device of at least some of the preceding embodiments.

In some embodiments, the invention is a transaction server of at least some of the preceding embodiments.

In some embodiments, the invention is a kiosk of at least some of the preceding embodiments.

Embodiments of the invention can be manifest in the form of methods and apparatuses for practicing those methods. Embodiments of the invention can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. Embodiments of the invention can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical reading of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art.

In this specification, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A method for facilitating a transaction for a patron using a wireless device at a touchpoint associated with a touchpoint business, the method comprising:

(a) the wireless device transmitting patron-identifying information to a transaction server operated by a transaction-funding business;

(b) the wireless device reading a touchpoint ID associated with the touchpoint;

(c) the wireless device transmitting the touchpoint ID to the transaction server;

(d) the transaction server authorizing the transaction; and (e) the transaction server transmitting authorization for the transaction to at least one of the wireless device and the touchpoint business, and the touchpoint business providing at least one of a good and a service associated with the transaction to the patron, wherein:

the transaction is a purchase of gaming credit at a touchpoint of a gaming establishment;

the touchpoint is a gaming table of the gaming establishment;

step (b) comprises the wireless device reading the touchpoint ID associated with the gaming table;

step (d) comprises the transaction server authorizing the purchase of the gaming credit;

step (e) comprises the transaction server transmitting authorization for the purchase of the gaming credit to the wireless device, and the gaming establishment providing the gaming credit to enable the patron to play at the gaming table;

the gaming establishment further comprises:

a ticket server configured to generate new gaming vouchers and redeem existing gaming vouchers, wherein each existing gaming voucher is associated with a unique voucher ID and a specified monetary value; and a kiosk configured to request generation of new gaming vouchers by the ticket server and to request redemption of existing gaming vouchers by the ticket server;

step (d) comprises:

(d1) the transaction server transmitting to the kiosk a kiosk request for a new gaming voucher having a monetary value associated with the gaming credit;

(d2) the kiosk transmitting to the ticket server the request for the new gaming voucher having the monetary value associated with the gaming credit;

(d3) the ticket server generating the new gaming voucher by associating a voucher ID with the monetary value associated with the gaming credit;

(d4) the ticket server transmitting to the kiosk the voucher ID associated with the new gaming voucher; and (d5) the kiosk transmitting to the transaction server the voucher ID associated with the new gaming voucher;

step (e) comprises:

(e1) the transaction server generating and transmitting to the wireless device a transaction package representing at least the voucher ID associated with the new gaming voucher;

(e2) the wireless device transmitting the transaction package to a printer;

(e3) the printer recovering the voucher ID associated with the new gaming voucher from the transaction package and printing a paper voucher having the voucher ID associated with the new gaming voucher such that the voucher ID is also associated with the paper voucher;

(e4) the ticket server receiving the voucher ID associated with the paper voucher;

(e5) the ticket server retrieving the monetary value associated with the voucher ID;

(e6) the ticket server transmitting the retrieved monetary value; and (e7) providing the gaming credit corresponding to the retrieved monetary value to enable the patron to play at the gaming table.

2. The method of claim 1, wherein the patron-identifying information comprises at least one of a wireless device ID associated with the wireless device and patron-authentication information for the patron.

3. The method of claim 2, wherein the patron-identifying information comprises the wireless device ID associated with the wireless device and the patron-authentication information for the patron.

4. The method of claim 1, further comprising:

(f) the transaction-funding business compensating the touchpoint business for the transaction; and (g) the patron compensating the transaction-funding business for the transaction.

5. The method of claim 1, further comprising:

(f) the patron directly compensating the touchpoint business for the transaction.

6. The method of claim 1, wherein:

the touchpoint ID is a tag ID of an optical tag; and step (a) comprises the wireless device optically reading the tag ID.

7. The method of claim 1, wherein:

the touchpoint ID is tag ID of a wireless tag; and step (a) comprises the wireless device wirelessly reading the tag ID.

8. The method of claim 1, wherein:

the transaction server generates the transaction package as an encrypted tokenized transaction package (TTP) message;

the wireless device is not configured to decrypt the TTP message to recover the voucher ID; and the printer decrypts the TTP message to recover the voucher ID.

9. The method of claim 1, wherein monetary value for the transaction never electronically resides on or electronically passes through the wireless device.

10. The method of claim 1, wherein, during the transaction, monetary value for the transaction never electronically resides on or electronically passes through an account of the patron.

11. The method of claim 1, wherein neither the patron nor the wireless device have access to a voucher ID for a voucher associated with the transaction.

12. A gaming establishment comprising:

a ticket server configured to generate new gaming vouchers and redeem existing gaming vouchers, wherein each existing gaming voucher is associated with a unique voucher ID and a specified monetary value;

a kiosk configured to request generation of new gaming vouchers by the ticket server and to request redemption of existing gaming vouchers by the ticket server;

a printer; and a gaming table, wherein:

a wireless device used by a patron of the gaming establishment is configured to transmit patron-identifying information to a transaction server operated by a transaction-funding business;

the wireless device is configured to transmit to the transaction server a request for purchase of gaming credit at the gaming table;

the wireless device is configured to read a touchpoint ID associated with the gaming table;

the wireless device is configured to transmit the touchpoint ID to the transaction server;

the transaction server is configured to authorize the purchase of the gaming credit;

the transaction server is configured to transmit authorization for the purchase of the gaming credit to the wireless device;

the gaming establishment is configured to provide the gaming credit to enable the patron to play at the gaming table;

the transaction server is configured to transmit to the kiosk a kiosk request for a new gaming voucher having a monetary value associated with the gaming credit;

the kiosk is configured to transmit to the ticket server a ticket server request for the new gaming voucher having the monetary value associated with the gaming credit;

the ticket server is configured to generate the new gaming voucher by associating a voucher ID with the monetary value associated with the gaming credit;

the ticket server is configured to transmit to the kiosk the voucher ID associated with the new gaming voucher;

the kiosk is configured to transmit to the transaction server the voucher ID associated with the new gaming voucher;

the transaction server is configured to generate and transmit to the wireless device a transaction package representing at least the voucher ID associated with the new gaming voucher;

the wireless device is configured to transmit the transaction package to the printer;

the printer is configured to recover the voucher ID associated with the new gaming voucher from the transaction package and print a paper voucher having the voucher ID associated with the new gaming voucher such that the voucher ID is also associated with the paper voucher;

the ticket server is configured to receive the voucher ID associated with the paper voucher;

the ticket server is configured to retrieve the monetary value associated with the voucher ID;

the ticket server is configured to transmit the retrieved monetary value; and the gaming credit corresponding to the retrieved monetary value is provided to enable the patron to play at the gaming table.

13. The gaming establishment of claim 12, wherein:

the transaction server is configured to generate the transaction package as an encrypted TTP message;

the wireless device is not configured to decrypt the TTP message to recover the voucher ID; and the printer is configured to decrypt the TTP message to recover the voucher ID.

14. The gaming establishment of claim 12, wherein monetary value associated with the gaming credit never electronically resides on or electronically passes through the wireless device.

15. The gaming establishment of claim 12, wherein, during the transaction, monetary value for the gaming credit never electronically resides on or electronically passes through an account of the patron.

16. The gaming establishment of claim 12, wherein neither the patron nor the wireless device have access to the voucher ID.

17. A printer for a gaming establishment further comprising:

a ticket server configured to generate new gaming vouchers and redeem existing gaming vouchers, wherein each existing gaming voucher is associated with a unique voucher ID and a specified monetary value;

a kiosk configured to request generation of new gaming vouchers by the ticket server and to request redemption of existing gaming vouchers by the ticket server; and a gaming table, wherein:

a wireless device used by a patron is configured to transmit patron-identifying information to a transaction server operated by a transaction-funding business;

the wireless device is configured to transmit to the transaction server a request for purchase of gaming credit at the gaming table;

the wireless device is configured to read a touchpoint ID associated with the gaming table;

the wireless device is configured to transmit the touchpoint ID to the transaction server;

the transaction server is configured to authorize the purchase of the gaming credit;

the transaction server is configured to transmit authorization for the purchase of the gaming credit to the wireless device;

the gaming establishment is configured to provide the gaming credit to enable the patron to play at the gaming table;

the transaction server is configured to transmit to the kiosk a kiosk request for a new gaming voucher having a monetary value associated with the gaming credit;

the kiosk is configured to transmit to the ticket server a ticket server request for the new gaming voucher having the monetary value associated with the gaming credit;

the ticket server is configured to generate the new gaming voucher by associating a voucher ID with the monetary value associated with the gaming credit;

the ticket server is configured to transmit to the kiosk the voucher ID associated with the new gaming voucher;

the kiosk is configured to transmit to the transaction server the voucher ID associated with the new gaming voucher;

the transaction server is configured to generate and transmit to the wireless device a transaction package representing at least the voucher ID associated with the new gaming voucher;

the wireless device is configured to transmit the transaction package to the printer;

the printer is configured to recover the voucher ID associated with the new gaming voucher from the transaction package and print a paper voucher having the voucher ID associated with the new gaming voucher such that the voucher ID is also associated with the paper voucher;

the ticket server is configured to receive the voucher ID associated with the paper voucher;

the ticket server is configured to retrieve the monetary value associated with the voucher ID;

the ticket server is configured to transmit the retrieved monetary value; and the gaming credit corresponding to the retrieved monetary value is provided to enable the patron to play at the gaming table.

18. The printer of claim 17, wherein:

the transaction server is configured to generate the transaction package as an encrypted TTP message;

the wireless device is not configured to decrypt the TTP message to recover the voucher ID; and the printer is configured to decrypt the TTP message to recover the voucher ID.

19. The printer of claim 17, wherein monetary value associated with the gaming credit never electronically resides on or electronically passes through the wireless device.

20. The printer of claim 17, wherein, during the transaction, monetary value for the gaming credit never electronically resides on or electronically passes through an account of the patron.

21. The printer of claim 17, wherein neither the patron nor the wireless device have access to the voucher ID.

22. A wireless device used by a patron in facilitating a transaction at a touchpoint of a touchpoint business, wherein:

the wireless device is configured to transmit patron-identifying information to a transaction server operated by a transaction-funding business;

the wireless device is configured to read a touchpoint ID associated with the touchpoint;

the wireless device is configured to transmit the touchpoint ID to the transaction server;

the transaction server is configured to authorize the transaction;

the transaction server is configured to transmit authorization for the transaction to at least one of the wireless device and the touchpoint business;

the touchpoint business is configured to provide at least one of a good and a service associated with the transaction to the patron;

the transaction is a purchase of gaming credit at a touchpoint of a gaming establishment;

the touchpoint is a gaming table of the gaming establishment;

the wireless device is configured to transmit the request for the purchase of the gaming credit to the transaction server;

the wireless device is configured to read the touchpoint ID associated with the gaming table;

the transaction server is configured to authorize the purchase of the gaming credit;

the transaction server is configured to transmit authorization for the purchase of the gaming credit to the wireless device;

the gaming establishment is configured to provide the gaming credit to enable the patron to play at the gaming table;

the gaming establishment further comprises:

a ticket server configured to generate new gaming vouchers and redeem existing gaming vouchers, wherein each existing gaming voucher is associated with a unique voucher ID and a specified monetary value; and a kiosk configured to request generation of new gaming vouchers by the ticket server and to request redemption of existing gaming vouchers by the ticket server, wherein:

the transaction server is configured to transmit to the kiosk a kiosk request for a new gaming voucher having a monetary value associated with the gaming credit;

the kiosk is configured to transmit to the ticket server a ticket server request for the new gaming voucher having the monetary value associated with the gaming credit;

the ticket server is configured to generate the new gaming voucher by associating a voucher ID with the monetary value associated with the gaming credit;

the ticket server is configured to transmit to the kiosk the voucher ID associated with the new gaming voucher;

the kiosk is configured to transmit to the transaction server the voucher ID associated with the new gaming voucher;

the transaction server is configured to generate and transmit to the wireless device a transaction package representing at least the voucher ID associated with the new gaming voucher;

the wireless device is configured to transmit the transaction package to the printer;

the printer is configured to recover the voucher ID associated with the new gaming voucher from the transaction package and print a paper voucher having the voucher ID associated with the new gaming voucher such that the voucher ID is also associated with the paper voucher;

the ticket server is configured to receive the voucher ID associated with the paper voucher;

the ticket server is configured to retrieve the monetary value associated with the voucher ID;

the ticket server is configured to transmit the retrieved monetary value; and the gaming credit corresponding to the retrieved monetary value is provided to enable the patron to play at the gaming table.

23. The wireless device of claim 22, wherein:

the transaction server is configured to generate the transaction package as an encrypted TTP message;

the wireless device is not configured to decrypt the TTP message to recover the voucher ID; and the printer is configured to decrypt the TTP message to recover the voucher ID.

24. The wireless device of claim 22, wherein monetary value for the transaction never electronically resides on or electronically passes through the wireless device.

25. The wireless device of claim 22, wherein, during the transaction, monetary value for the transaction never electronically resides on or electronically passes through an account of the patron.

26. The wireless device of claim 22, wherein neither the patron nor the wireless device have access to a voucher ID for a voucher associated with the transaction.

27. A transaction server operated by a transaction-funding business for use in facilitating a transaction at a touchpoint of a touchpoint business using a wireless device used by a patron, wherein:

the transaction server is configured to receive patron-identifying information from the wireless device;

the wireless device is configured to read a touchpoint ID associated with the touchpoint;

the transaction server is configured to receive the touchpoint ID from the wireless device;

the transaction server is configured to authorize the transaction;

the transaction server is configured to transmit authorization for the transaction to at least one of the wireless device and the touchpoint business;

the touchpoint business is configured to provide at least one of a good and a service associated with the transaction to the patron;

the transaction is a purchase of gaming credit at a touchpoint of a gaming establishment;

the touchpoint is a gaming table of the gaming establishment;

the transaction server is configured to receive the request for the purchase of the gaming credit from the wireless device;

the wireless device is configured to read the touchpoint ID associated with the gaming table;

the transaction server is configured to authorize the purchase of the gaming credit;

the transaction server is configured to transmit authorization for the purchase of the gaming credit to the wireless device;

the gaming establishment is configured to provide the gaming credit to enable the patron to play at the gaming table;

the gaming establishment further comprises:

a ticket server configured to generate new gaming vouchers and redeem existing gaming vouchers, wherein each existing gaming voucher is associated with a unique voucher ID and a specified monetary value;

a kiosk configured to request generation of new gaming vouchers by the ticket server and to request redemption of existing gaming vouchers by the ticket server; and a printer, wherein:

the transaction server is configured to transmit to the kiosk a kiosk request for a new gaming voucher having a monetary value associated with the gaming credit;

the kiosk is configured to transmit to the ticket server a ticket server request for the new gaming voucher having the monetary value associated with the gaming credit;

the ticket server is configured to generate the new gaming voucher by associating a voucher ID with the monetary value associated with the gaming credit;

the ticket server is configured to transmit to the kiosk the voucher ID associated with the new gaming voucher;

the transaction server is configured to receive from the kiosk the voucher ID associated with the new gaming voucher;

the transaction server is configured to generate and transmit to the wireless device a transaction package representing at least the voucher ID associated with the new gaming voucher;

the wireless device is configured to transmit the transaction package to the printer;

the printer is configured to recover the voucher ID associated with the new gaming voucher from the transaction package and print a paper voucher having the voucher ID associated with the new gaming voucher such that the voucher ID is also associated with the paper voucher;

the ticket server is configured to receive the voucher ID associated with the paper voucher;

the ticket server is configured to retrieve the monetary value associated with the voucher ID;

the ticket server is configured to transmit the retrieved monetary value; and the gaming credit corresponding to the retrieved monetary value is provided to enable the patron to play at the gaming table.

28. The transaction server of claim 27, wherein:

the transaction server is configured to generate the transaction package as an encrypted TTP message;

the wireless device is not configured to decrypt the TTP message to recover the voucher ID; and the printer is configured to decrypt the TTP message to recover the voucher ID.

29. The transaction server of claim 27, wherein monetary value for the transaction never electronically resides on or electronically passes through the wireless device.

30. The transaction server of claim 27, wherein, during the transaction, monetary value for the transaction never electronically resides on or electronically passes through an account of the patron.

31. The transaction server of claim 27, wherein neither the patron nor the wireless device have access to a voucher ID for a voucher associated with the transaction.

32. A kiosk for a gaming establishment further comprising:

a ticket server configured to generate new gaming vouchers and redeem existing gaming vouchers, wherein each existing gaming voucher is associated with a unique voucher ID and a specified monetary value;

a printer; and a gaming table, wherein:

the kiosk is configured to request generation of new gaming vouchers by the ticket server and to request redemption of existing gaming vouchers by the ticket server;

a wireless device used by a patron is configured to transmit patron-identifying information to a transaction server operated by a transaction-funding business;

the wireless device is configured to transmit to the transaction server a request for purchase of gaming credit at the gaming table;

the wireless device is configured to read a touchpoint ID associated with the gaming table;

the wireless device is configured to transmit the touchpoint ID to the transaction server;

the transaction server is configured to authorize the purchase of the gaming credit;

the kiosk is configured to receive from the transaction server a kiosk request for a new gaming voucher having a monetary value associated with the gaming credit;

the kiosk is configured to transmit to the ticket server a ticket server request for the new gaming voucher having the monetary value associated with the gaming credit;

the ticket server is configured to generate the new gaming voucher by associating a voucher ID with the monetary value associated with the gaming credit;

the kiosk is configured to receive from the ticket server the voucher ID associated with the new gaming voucher;

the kiosk is configured to transmit to the transaction server the voucher ID associated with the new gaming voucher;

the transaction server is configured to generate and transmit to the wireless device a transaction package representing at least the voucher ID associated with the new gaming voucher;

the wireless device is configured to transmit the transaction package to the printer;

the printer is configured to recover the voucher ID associated with the new gaming voucher from the transaction package and print a paper voucher having the voucher ID associated with the new gaming voucher such that the voucher ID is also associated with the paper voucher;

the ticket server is configured to receive the voucher ID associated with the paper voucher;

the ticket server is configured to retrieve the monetary value associated with the voucher ID;

the ticket server is configured to transmit the retrieved monetary value; and the gaming credit corresponding to the retrieved monetary value is provided to enable the patron to play at the gaming table.

33. The kiosk of claim 32, wherein:

the kiosk is configured to set a voucher-redemption timer for the gaming voucher generated by the ticket server;

the kiosk is configured to query the ticket server about the gaming voucher after expiration of the voucher-redemption timer;

the kiosk is configured such that, if the gaming voucher still exists after the expiration of the voucher-redemption timer, then the kiosk cancels the purchase of the gaming credit.

34. The kiosk of claim 33, wherein the kiosk cancels the purchase of the gaming credits by:

the kiosk instructing the ticket server to redeem the gaming voucher; and the kiosk instructing the transaction server to cancel the purchase of the gaming credits.

35. The kiosk of claim 32, wherein monetary value associated with the gaming credit never electronically resides on or electronically passes through the wireless device.

36. The kiosk of claim 32, wherein, during the transaction, monetary value for the gaming credit never electronically resides on or electronically passes through an account of the patron.

37. The kiosk of claim 32, wherein neither the patron nor the wireless device have access to the voucher ID.

* * * * *